(12) United States Patent
Ikeda et al.

(10) Patent No.: US 8,721,408 B2
(45) Date of Patent: May 13, 2014

(54) AIR CONDITIONER FOR VEHICLE

(75) Inventors: Shintaro Ikeda, Kai (JP); Shinya Chiba, Shioya-gun (JP); Naoki Higa, Utsunomiya (JP); Keiko Arai, Shioya-gun (JP)

(73) Assignee: Keihin Corporation (JP)

( * ) Notice: Subject to any disclaimer, the term of this patent is extended or adjusted under 35 U.S.C. 154(b) by 495 days.

(21) Appl. No.: 12/947,348

(22) Filed: Nov. 16, 2010

(65) Prior Publication Data

US 2011/0117829 A1 May 19, 2011

(30) Foreign Application Priority Data

| Nov. 18, 2009 | (JP) | 2009-263249 |
| Nov. 18, 2009 | (JP) | 2009-263250 |
| Nov. 18, 2009 | (JP) | 2009-263251 |
| Nov. 18, 2009 | (JP) | 2009-263255 |

(51) Int. Cl.
*B60H 3/00* (2006.01)

(52) U.S. Cl.
USPC ............ 454/156; 454/155; 454/160; 165/203

(58) Field of Classification Search
USPC ........................................ 454/155, 156, 160
See application file for complete search history.

(56) References Cited

U.S. PATENT DOCUMENTS

| 5,062,352 | A | * | 11/1991 | Ostrand ........................ 454/121 |
| 5,109,755 | A | * | 5/1992 | Guillemin ..................... 454/160 |
| 5,676,595 | A | * | 10/1997 | Sumiya et al. ................ 454/121 |
| 5,701,949 | A | * | 12/1997 | Yamaguchi et al. ............ 165/42 |
| 5,899,806 | A | * | 5/1999 | Hase et al. .................... 454/156 |
| 5,967,890 | A | * | 10/1999 | Loup et al. .................... 454/121 |
| 5,988,263 | A | * | 11/1999 | Schwarz ......................... 165/41 |
| 6,106,386 | A | * | 8/2000 | Schwarz ....................... 454/143 |
| 6,296,562 | B1 | * | 10/2001 | Uemura et al. ............... 454/121 |
| 6,478,671 | B2 | * | 11/2002 | Murai et al. .................. 454/156 |
| 6,588,496 | B2 | * | 7/2003 | Nakagawa et al. ............. 165/42 |
| 6,612,923 | B1 | * | 9/2003 | Flynn ............................ 454/265 |
| 6,668,909 | B2 | * | 12/2003 | Vincent .......................... 165/42 |
| 6,814,137 | B2 | * | 11/2004 | Tsurushima et al. ......... 165/202 |

(Continued)

FOREIGN PATENT DOCUMENTS

| JP | 05180482 A | 7/1993 |
| JP | 2003-2034 A | 1/2003 |

(Continued)

OTHER PUBLICATIONS

Notice of Reasons for Rejection for Japanese Application No. 2009-263251; Date of Mailing: Jun. 25, 2013, with English Translation.*

(Continued)

*Primary Examiner* — Kang Hu
*Assistant Examiner* — Jonathan Cotov
(74) *Attorney, Agent, or Firm* — Cantor Colburn LLP

(57) ABSTRACT

An air conditioner for a vehicle includes: an air-blowing guide that includes a flexible connecting section that elastically deforms, and a pair of engaging sections that are arranged at both ends of the flexible connecting section, is arranged in a mixing region of a hot air and a cool air, and guides the hot air and the cool air; and a case that includes a protrusion that engages the engaging section in a state where the flexible connecting section is elastically deformed, the case in which the air-blowing guide is provided.

9 Claims, 17 Drawing Sheets

(56) References Cited

U.S. PATENT DOCUMENTS

| | | | |
|---|---|---|---|
| 6,889,761 B2 * | 5/2005 | Perry et al. | 165/202 |
| 7,055,591 B2 * | 6/2006 | Kang et al. | 165/203 |
| 7,063,612 B2 * | 6/2006 | Kaszycki | 454/121 |
| 7,074,122 B2 * | 7/2006 | Haupt et al. | 454/156 |
| 7,228,895 B2 * | 6/2007 | Natsume et al. | 165/204 |
| 7,281,574 B2 * | 10/2007 | Shibata et al. | 165/203 |
| 7,331,851 B2 * | 2/2008 | Koukouravas | 454/160 |
| 7,533,691 B2 * | 5/2009 | Marcoux et al. | 137/523 |
| 7,563,159 B2 * | 7/2009 | Newman et al. | 454/156 |
| 7,575,511 B2 * | 8/2009 | Haupt et al. | 454/156 |
| 7,798,207 B2 * | 9/2010 | Tarukawa | 165/202 |
| 7,950,444 B2 * | 5/2011 | Masatsugu | 165/42 |
| 8,302,674 B2 * | 11/2012 | Kim et al. | 165/202 |
| 8,460,073 B2 * | 6/2013 | Gotoh et al. | 454/156 |
| 2002/0000307 A1 * | 1/2002 | Denk et al. | 165/42 |
| 2002/0004368 A1 * | 1/2002 | Denk et al. | 454/160 |
| 2002/0129933 A1 * | 9/2002 | Ozeki et al. | 165/203 |
| 2003/0234098 A1 * | 12/2003 | Huang et al. | 165/43 |
| 2004/0016536 A1 * | 1/2004 | Auer et al. | 165/203 |
| 2004/0185768 A1 * | 9/2004 | Mizutani | 454/160 |
| 2004/0231834 A1 * | 11/2004 | Shibata et al. | 165/204 |
| 2005/0159097 A1 * | 7/2005 | Newman et al. | 454/156 |
| 2006/0027354 A1 * | 2/2006 | Vincent et al. | 165/42 |
| 2008/0108293 A1 * | 5/2008 | Haupt et al. | 454/156 |
| 2009/0068939 A1 * | 3/2009 | Onda et al. | 454/152 |
| 2009/0093210 A1 * | 4/2009 | Livchak et al. | 454/363 |
| 2009/0209189 A1 * | 8/2009 | Kiel et al. | 454/145 |
| 2009/0264061 A1 * | 10/2009 | Kim, II | 454/143 |
| 2010/0120346 A1 * | 5/2010 | Jansen | 454/152 |
| 2010/0167635 A1 * | 7/2010 | Gotoh et al. | 454/121 |

FOREIGN PATENT DOCUMENTS

| | | | | |
|---|---|---|---|---|
| JP | 2004237940 A | | | 8/2004 |
| JP | 2005138735 A | | | 6/2005 |
| JP | 2005153824 A | | | 6/2005 |
| JP | 2007125955 A | | * | 5/2007 |
| JP | 2007331416 A | | | 12/2007 |
| JP | 2008143514 A | | | 6/2008 |
| JP | 2009227026 A | | | 10/2009 |

OTHER PUBLICATIONS

Notice of Allowance for Japanese Application No. 2009-263249; Date of Mailing: Jun. 25, 2013 with English Translation.

Notice of Allowance for Japanese Application No. 2009-263250; Date of Mailing: Jun. 25, 2013, with English Translation.

Notice of Reasons for Rejection for Japanese Application No. 2009-263255; Date of Mailing: Jul. 30, 2013, with English Translation.

* cited by examiner

AIR CONDITIONER FOR VEHICLE

BACKGROUND OF THE INVENTION

Priority is claimed to Japanese Patent Application No. 2009-263249, filed on Nov. 18, 2009, Japanese Patent Application No. 2009-263250, filed on Nov. 18, 2009, Japanese Patent Application No. 2009-263251, filed on Nov. 18, 2009, and Japanese Patent Application No. 2009-263255, filed on Nov. 18, 2009, the contents of each of which are incorporated herein by reference.

FIELD OF THE INVENTION

The present invention relates to an air conditioner for a vehicle.

DESCRIPTION OF THE RELATED ART

Generally, in an air conditioner for a vehicle, supplied air becomes cool air by using an evaporator and regulating the heating ratio of the cool air, and thus conditioned air is generated.

More specifically, the air conditioner for a vehicle includes a case that forms an outer shape and provides flow passages therein. Also, the case interior is divided into two flow passages and a heater core is disposed at one of two flow passages. Thus, in the air conditioner for a vehicle, regulating the amount of cool air supplied toward flow passages in which the heater core is disposed regulates the heating ratio of the cool air.

Since the air conditioner for the vehicle needs to be installed within the limited space of the vehicle, it is difficult to adopt a larger design of the air conditioner. Therefore, every effort have been required to design the air conditioner as compact as possible. Therefore, also for the aforementioned case, smaller dimensions have been aimed for. Accordingly, it has been difficult to ensure wide enough case interior, in other words the space of the flow passages. That the space of the case interior cannot be sufficiently secured means the mixing region of the cool air and the hot air being narrowed. As a result, there is a concern that the cool air and the hot air cannot be mixed sufficiently. The air conditioner for a vehicle includes a plurality of vent outlets (defroster vent outlet, face vent outlet and foot vent outlet). In a case where the cool air and the hot air are not mixed sufficiently, the temperature of the conditioned air that is supplied into the vehicle from the vent outlet is varied unintentionally.

To solve above-described problems, for example, in Japanese Unexamined Patent Application, First Publication No. 2003-2034, an air conditioner for a vehicle is disclosed, which includes an air-blowing guide (an induction means 33 in above-described publication) that guides the hot air and the cool air and selectively guides the hot air to the defroster vent outlet.

The air-blowing guide is attached first with respect to one side of the divided case when assembling the air conditioner for a vehicle. Then, the other side of the case is attached so that the air-blowing guide is accommodated within the case.

However, not only the air-blowing guide but also various parts such as the evaporator, the heater core or the like are accommodated within the case. Thus, when assembling the air conditioner for a vehicle, those parts need to be attached to the case that is divided with the air-blowing guide.

In the conventional air conditioner for a vehicle, sometimes, the air-blowing guide is left out from the case when attaching parts such as the evaporator, the heat core or the like, and there is a problem that assemblability is poor.

Also, in the conventional air conditioner for a vehicle, the temperature of conditioned air that is supplied into the vehicle from each of the vent outlets can meet to a certain degree of a preferred temperature by providing the air-blowing guide. However, in practice, the temperature of the conditioned air cannot be optimized only by providing the air-blowing guide.

For example, since the flow rate distribution of the hot air is varied in the mixing region, there is a case where the flow rate balance between the hot air and the cool air, supplied into the mixing region does not match each other. Thus, a phenomenon where a portion of the cool air is extracted from the mixing region without mixing is confirmed.

Also, a support member of the air-blowing guide that is fixed at the opening side for hot air formed within the case is exposed for an extended period in a high temperature environment so that it may be bent. A situation is confirmed wherein a portion of the hot air does not pass through the mixing region as intended and leaks.

Also, a hot air guide tube is disposed at the air-blowing guide so that a portion of the hot air passes through the mixing region without mixing with the cool air intentionally. In this case, a phenomenon is confirmed that temperature is increased excessively at the outlet side of the hot air guide tube.

In the air conditioner for a vehicle, the hot air that is supplied from an opening for hot air and the cool air that is supplied from an opening for cool air within the case, are mixed in the mixing region.

However, an opening area of the opening for cool air is relatively narrow compared to the volume of the mixing region. Thus, when the cool air that passes through the opening for cool air arrives at the mixing region, a disturbed flow is formed caused by generation of separation from the flow passage wall in the mixing region. As a result, so called flow noise (loud noise) is generated.

A hot air guiding passage is disposed in the air-blowing guide so that a portion of the hot air is not mixed with the cool air intentionally in the mixing region and passes therethrough, however in this case, the phenomenon is confirmed that temperature is excessively increased at the outlet side of the hot air guide tube.

As described above, a method whereby a portion of the airflow that is not mixed in the mixing region passes through the mixing region is an effective method in the air conditioner for a vehicle in which the mixing effectiveness is not sufficiently obtained in the mixing region. However, there is a case where the environment of the passing destination is excessively affected by the airflow passing through. In such a case, the temperature of the conditioned air that is supplied into the vehicle diverges from the optimized condition, even if slightly.

An object of a first embodiment of the present invention is that it provides an air conditioner for a vehicle having an air-blowing guide, wherein the air-blowing guide is prevented from being left out when assembling and assemblability can be enhanced.

An object of a second embodiment of the present invention is that it provides an air conditioner for a vehicle having an air-blowing guide, wherein the temperature of the conditioned air can be better optimized than that of the conventional air conditioner for a vehicle.

An object of a third embodiment of the present invention is that it provides an air conditioner for a vehicle in which the hot air that is supplied from the opening for hot air and the cool air that is supplied from the opening for cool air are mixed in the mixing region within a case, wherein noise generated in the mixing region can be decreased.

An object of a fourth embodiment of the present invention is that it provides an air conditioner for a vehicle having an air-blowing guide wherein the temperature of the conditioned air can be better optimized by controlling than that of the conventional air conditioner for a vehicle.

SUMMARY OF THE INVENTION

The present invention employs the below described means to obtain the objects solving the above-described problems.

According to a first aspect of the present invention, an air conditioner for a vehicle includes: an air-blowing guide that includes a flexible connecting section that elastically deforms, and a pair of engaging sections that are arranged at both ends of the flexible connecting section, is arranged in a mixing region of a hot air and a cool air, and guides the hot air and the cool air; and a case that includes a protrusion that engages the engaging section in a state where the flexible connecting section is elastically deformed, the case in which the air-blowing guide is provided.

It may be arranged such that at least any one surface of a contacting surface of the engaging section with respect to the protrusion and a contacting surface of the protrusion with respect to the engaging section is inclined with respect to an interior wall of the case.

It may be arranged such that the flexible connecting section has an arc shape; and the engaging section is engaged with a side surface of an outside of the protrusion.

It may be arranged such that the air conditioner for a vehicle further includes a mound section that is provided so as to pinch the engaging sections with the protrusion.

According to a second aspect of the present invention, an air conditioner for a vehicle includes: an air-blowing guide that is arranged in a mixing region of a first airflow and a second airflow, guides the first airflow and the second airflow, and includes a flow rate distribution regulating section that regulates a flow rate distribution of the first airflow toward the mixing region according to a flow rate distribution of the second airflow toward the mixing region; and a case in which the air-blowing guide is provided.

It may be arranged such that the flow rate distribution regulating section is a regulating member that changes a flow passage width of the first airflow so as to regulate the flow rate distribution of the first airflow.

It may be arranged such that the air-blowing guide further includes a support member that is a frame that supports the shape of the air-blowing guide, and the regulating member is integrally formed with the support member.

It may be arranged such that the regulating member further includes a thickness extraction region that uniformizes a thickness of the regulating member in the extension direction.

It may be arranged such that the supporting member is reinforced at a center portion thereof in the extension direction of the supporting member.

It may be arranged such that the supporting member is reinforced at the center portion thereof by ribs that are extended in a direction orthogonal to a flow direction of the first airflow or the second airflow that is passing through the supporting member.

According to a third aspect of the present invention, an air conditioner for a vehicle includes: an air-blowing guide that is arranged in a mixing region of a first airflow and a second airflow, and guides the first airflow and the second airflow; a case in which the air-blowing guide is provided; and an adjusting section that is provided in the case, and adjusts the first airflow or the second airflow that is supplied to the mixing region from a plurality of openings provided within the case.

It may be arranged such that the adjusting section is an adjusting member that is arranged in parallel with respect to an air blowing direction of the first airflow or the second airflow from the openings.

It may be arranged such that the air conditioner for a vehicle further includes a slider damper that regulates the opening ratio of the openings, wherein the adjusting member is arranged at an extended position in the air blowing direction of the first airflow or the second airflow from an end portion of the slider damper when the slider damper is in a middle portion.

It may be arranged such that the air-blowing guide further includes a support member that is a frame that supports a shape of the air-blowing guide, and the adjusting member extends closer to an opening side than the support member.

It may be arranged such that the air-blowing guide further includes supporting ribs that support the adjusting member.

According to a fourth aspect of the present invention, an air conditioner for a vehicle includes: an air-blowing guide that is arranged in a mixing region of a first airflow and a second airflow, includes a second airflow guide passage that guides a portion of the second airflow without mixing with the first airflow in the mixing region, and a first airflow introduction opening that is opened to the second airflow guide passage and simultaneously introduces a portion of the first airflow within the second airflow guide passage, and guides the first airflow and the second airflow; and a case in which the air-blowing guide is provided.

It may be arranged such that the first airflow introduction openings are formed in plurality in a direction orthogonal to the air blowing direction of the second airflow that is flowed in the second airflow guide passage.

It may be arranged such that the first airflow introduction openings are formed in plurality in the air blowing direction of the second airflow that is flowed in the second airflow guide passage.

It may be arranged such that a side wall of the first airflow introduction opening is inclined so as to become narrower toward an inside of the second airflow guide passage.

According to the first aspect of the air conditioner for a vehicle of the present invention, the flexible connecting section that connects the engaging sections to each other is elastically deformed and the engaging sections are engaged with the protrusion so that the engaging sections strongly press the protrusion by the restoring force of the flexible connecting section. As a result, the air-blowing guide is fixed to the case.

Also, the air-blowing guide can be fixed to the case so that the air-blowing guide is prevented from being left out when the air conditioner for a vehicle including other parts such as the evaporator, the heater core is assembled.

Accordingly, in the air conditioner for a vehicle that includes the air-blowing guide, the air-blowing guide can be prevented from being left out and the assimilability can be enhanced during the assembling.

According to the second aspect of the air conditioner for a vehicle of the present invention, the flow rate distribution of the cool air toward the mixing region is regulated according to the flow rate distribution of the hot air toward the mixing region by the flow rate distribution regulating section. Thus, the flow rate balance between the hot air and the cool air is obtained in the mixing region and the hot air and the cool air can be uniformly mixed without the leakage of the cool air from the mixing region.

Accordingly, in the air conditioner for a vehicle that includes the air-blowing guide, the temperature of the conditioned air can be better optimized than that of the conventional air conditioner for a vehicle.

According to the third aspect of the air conditioner for a vehicle of the present invention, the first airflow or the second airflow that is supplied to the mixing region from the opening for cool air is adjusted by the adjusting section. Thus, turbulent flow can be prevented from being generated and the flow noise can be prevented from being generated within the mixing region.

Accordingly, in the air conditioner for a vehicle in which the first airflow and the second airflow are mixed in the mixing region within the case, the noise generated in the mixing region can be decreased.

According to the fourth aspect of the air conditioner for a vehicle of the present invention, the air-blowing guide includes a second airflow guide passage that guides a portion of the second airflow without mixing with the first airflow in the mixing region; and a first airflow introduction opening that is opened to the second airflow guide passage and simultaneously introduces a portion of the first airflow within the second airflow guide passage.

Thus, the environment of the outlet side of the second airflow guiding passage cannot be excessively affected by the second airflow.

Accordingly, in the air conditioner for a vehicle that includes the air-blowing guide, the temperature of the conditioned air can be controlled to be better optimized than that of the conventional air conditioner for a vehicle.

Figure 1:
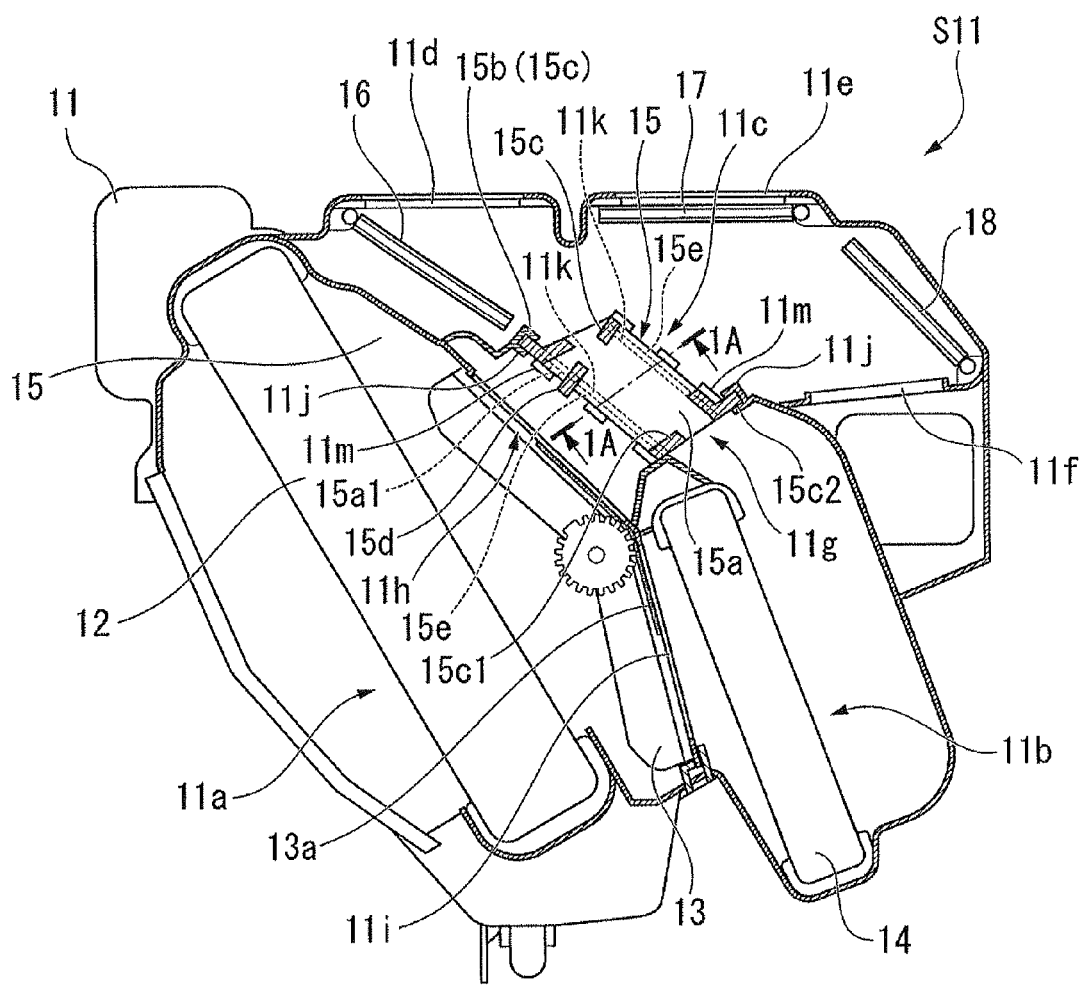
FIG. 1 is a cross sectional view schematically showing a configuration of an air conditioner for a vehicle according to a first embodiment of the present invention.

DETAILED DESCRIPTION OF THE INVENTION (1) First Embodiment

Hereinafter, description will be made regarding the air conditioner for a vehicle according to the first embodiment of the present invention with reference to drawings. In the drawings, each of the members is appropriately suitably scaled to make it be of identifiable size.

FIG. 1 is a cross sectional view schematically showing a configuration of the air conditioner for a vehicle S11 (HVAC: Heating Ventilation Air Conditioning) according to the first embodiment of the present invention. As shown in FIG. 1, the air conditioner for a vehicle S11 according to the embodiment includes a case 11, an evaporator 12, an air mix damper apparatus 13, a heater core 14, an air-blowing guide 15, a mode damper 16 for a defroster vent outlet, a mode damper 17 for a face vent outlet, and a mode damper 18 for a foot vent outlet.

The case 11 is formed an outer shape of the air conditioner for a vehicle S11 according to the embodiment. A cooling flow passage 11*a* in which the evaporator 12 is provided, a heating flow passage 11*b* in which the heater core 14 is provided, and a mixing section 11*c* in which cool air and hot air are mixed and become conditioned air are disposed within the case 11. Also, a plurality of vent outlets (a defroster vent outlet 11*d*, a face vent outlet 11*e* and a foot vent outlet 11*f*) that is exposed to the outside and is connected to the mixing section 11*c* (a mixing region) is provided in the case 11.

The defroster vent outlet 11*d* is an opening to supply the conditioned air with respect to a window shield. The face vent outlet 11*e* is an opening to supply the conditioned air with respect to the face of the occupant. The foot vent outlet 11*f* is an opening to supply the conditioned air with respect to the feet of the occupant.

As shown in FIG. 1, an opening 11*g* for hot air that supplies the hot air to the mixing section 11*c* from the heating flow passage 11b in which the heater core 14 is provided, an opening 11h for cool air that supplies the cool air to the mixing section 11c from the cooling flow passage 11a in which the evaporator 12 is provided, and an opening 11i for heating that supply the cool air to the heating flow passage 11b from the cooling flow passage 11a are provided in the case 11.

The evaporator 12 is a part of a refrigeration cycle that is mounted on the vehicle and is arranged within the cooling flow passage 11a. The evaporator 12 cools air that is supplied in the cooling flow passage 11a by a blower (not shown) and then generates the cool air.

The air mix damper apparatus 13 is arranged on the downstream side of the evaporator 12 and regulates an amount of the cool air that is generated at the evaporator 12 to the heating flow passage 11b. More specifically, the air mix damper apparatus 13 includes an air mix damper 13a that is freely slidable between the opening 11h for cool air and the opening 11i for heating. An opening ratio between the opening 11h for cool air and the opening 11i for heating can be regulated by the air mix damper 13a. Accordingly, the cool air supply amount to the heating flow passage 11b can be regulated. As a result, a mixing ratio between the cool air and the hot air in the mixing section 11c can be regulated so that the temperature of the conditioned air can be regulated.

The heater core 14 is arranged within the heating flow passage 11b and heats the cool air that is supplied through the opening 11i for heating so that the heater core 14 generates the hot air.

The air-blowing guide 15 is provided in the mixing section 11c that is a mixing region of the hot air and the cool air within the case and guides the hot air and the cool air.

Figure 2:
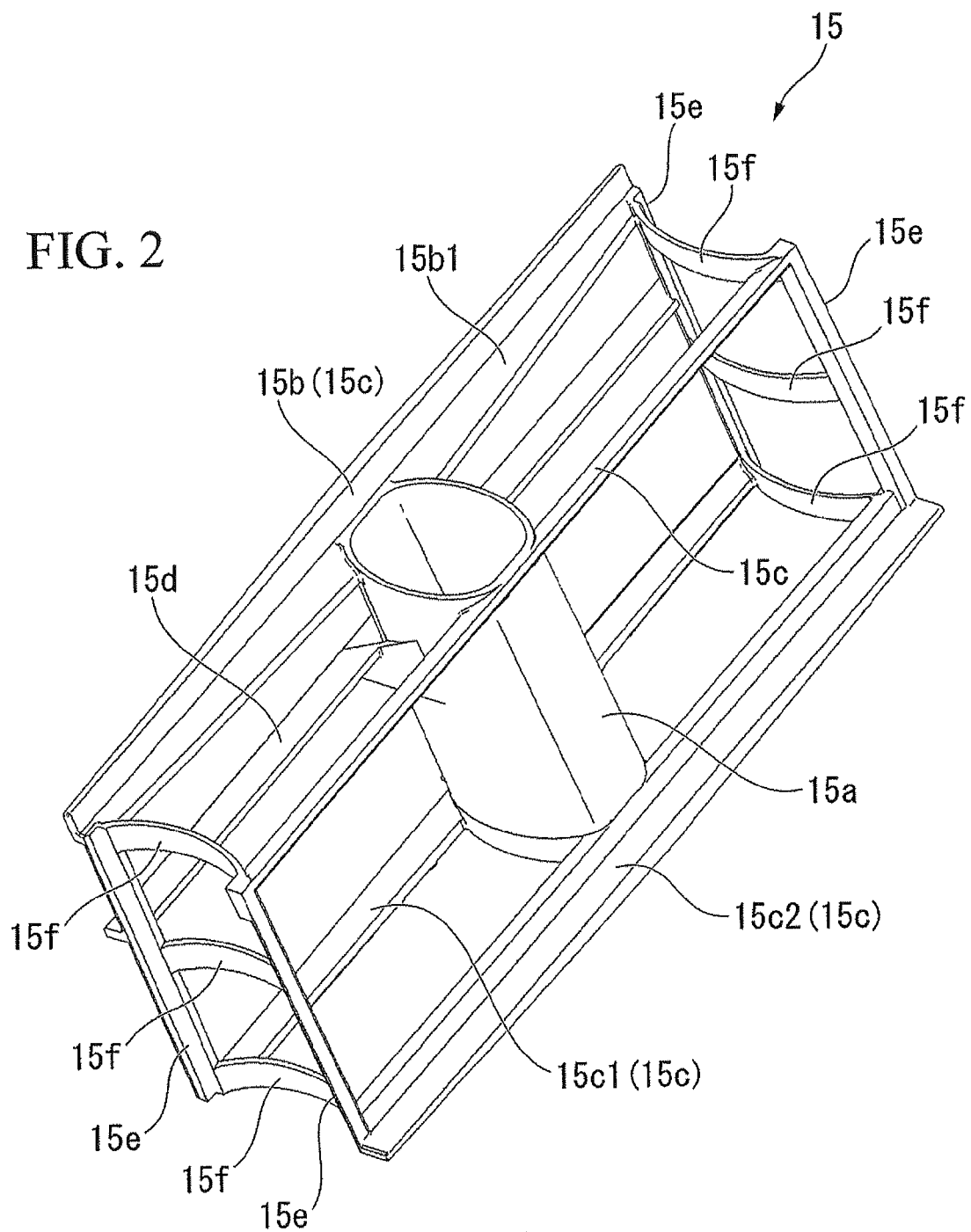
FIG. 2 is a perspective view showing an air-blowing guide that is included in the air conditioner for a vehicle according to the first embodiment seen from a side opposite an opening for cool air that is provided within a case.
Figure 3:
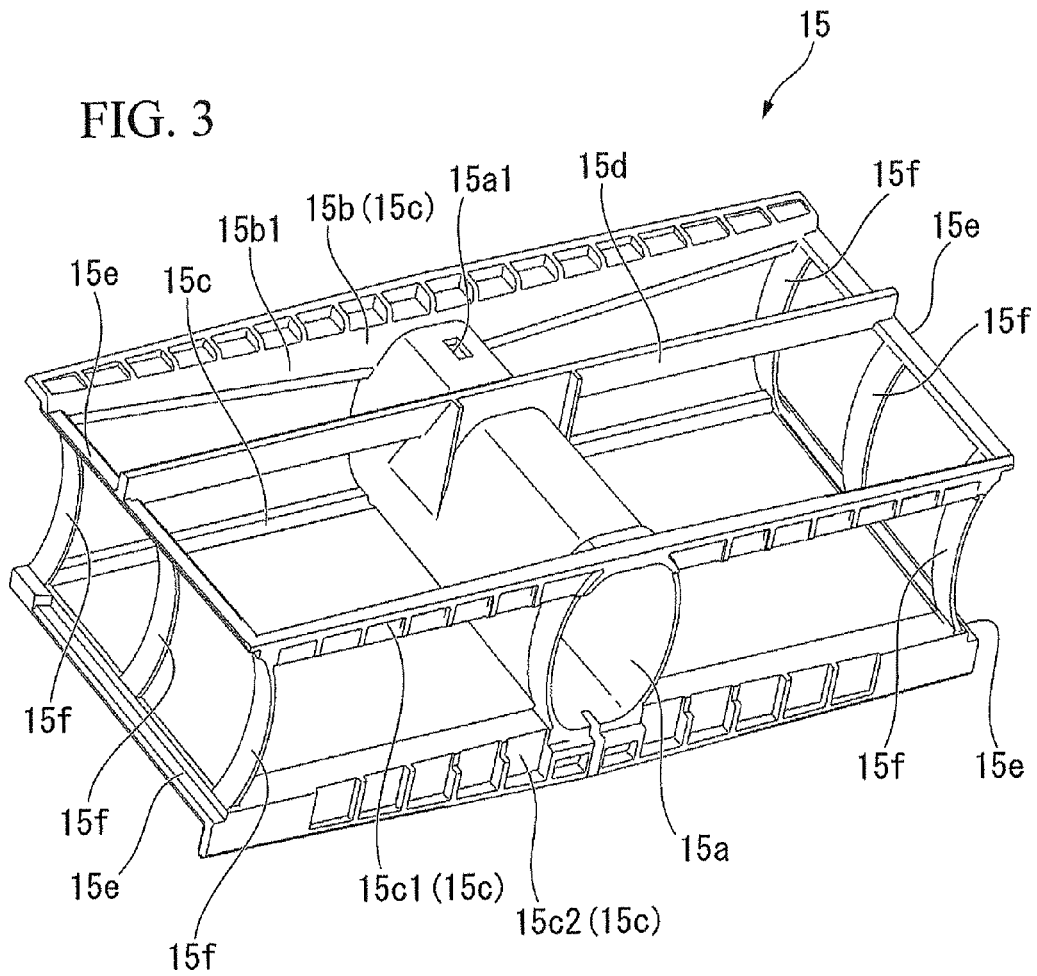
FIG. 3 is a perspective view showing the air-blowing guide that is included in the air conditioner for a vehicle according to the first embodiment seen from a side of the opening for cool air that is provided within the case.

FIGS. 2 and 3 are perspective views of the air-blowing guide 15. FIG. 2 is a perspective view showing the air-blowing guide 15 seen from a side opposite the opening 11h for cool air. FIG. 3 is a perspective view showing the air-blowing guide 15 seen from a side of the opening 11h for cool air. As shown in the drawings, the air-blowing guide 15 includes a hot air guide tube 15a, a regulating member 15b, a support member 15c, an adjusting member 15d, an engaging section 15e and a flexible connecting section 15f.

The hot air guide tube 15a is a straight tube shape member that guides a portion of the hot air that is supplied to the mixing section 11c from the opening 11g for hot air to the defroster vent outlet 11d without mixing with the cool air. One opening end of the hot air guide tube 15a is connected to the opening 11g for hot air and the other opening end is arranged so as to be directed to the defroster vent outlet 11d.

As shown in FIG. 3, a cool air introduction opening 15a1 for introducing the cool air to the hot air guide tube 15a is formed at a portion in the vicinity of the regulating member 15b which is a surface of the opening 11h for cool air side of the hot air guide tube 15a. As described above, the hot air guide tube 15a is formed so as to introduce a portion of the cool air that is supplied to the mixing section 11c from the opening 11h for cool air in the hot air guide tube 15a.

The regulating member 15b directs the air blow direction of the cool air that is supplied to the mixing section 11c from the opening 11h for cool air toward the opening 11g for hot air such that the inclined region 15b1 that is opposite the opening 11h for cool air is inclined toward the opening 11g for hot air.

The regulating member 15b regulates a flow rate distribution of the cool air that is supplied to the mixing section 11c from the opening 11h for cool air according to the flow rate distribution of the hot air that is supplied to the mixing section 11c from the opening 11g for hot air such that the width of an inclined region 15b1 is changed in an extension direction of the regulating member.

Also, the regulating member 15b has a function as the support member 15c that functions as a frame that the air-blowing guide 15 supports its shape. In other words, in the air conditioner for a vehicle S11 according to the embodiment, the regulating member 15b is integrally formed with one support member 15c.

As described above, the support member 15c is integrally formed with the regulating member 15b and is connected to each of four corners of the hot air guide tube 15a so as to function as the frame that the shape of the air-blowing guide supports its shape. Also, as shown in FIGS. 2 and 3, the support member 15c and the regulating member 15b are arranged in parallel to each other. The support member 15c that is integrally formed with the regulating member 15b is arranged on an upper end (an end of the opening 11h for cool air away from the opening 11g for hot air) of the opening 11h for cool air. One support member 15c (a first support member 15c1) is arranged on the lower end (the end of the opening 11h for cool air adjacent the opening 11g for hot air) of the opening 11h for cool air. One support member 15c (a second support member 15c2) is arranged at an end of the opening 11g for hot air away from the opening 11h for cool air.

Also, as shown in FIG. 1, each of fitting grooves 11j that is extended to the vertical direction of the paper surface is fondled at the upper end (the end of the opening 11h for cool air away from the opening 11g for hot air) of the opening 11h for cool air, and an end of the opening 11g for hot air away from the opening 11h for cool air. The regulating member 15b and the second support member 15c2 are fitted at the fitting groove 11j so that the positioning of the air-blowing guide 15 is performed.

The adjusting member 15d is arranged horizontally at the opening 11h for cool air. In other words, the adjusting member 15d is arranged in parallel with the support member 15c at the opening 11h for cool air. The adjusting member 15d adjusts the cool air that is supplied to the mixing section 11c from the opening 11h for cool air so that disturbed flow is prevented from being generated. Accordingly, flow noise is prevented from being generated.

The engaging section 15e is engaged to the case 11 so that the air-blowing guide 15 is fixed to the case 11. Also, the flexible connecting section 15f arranges two engaging sections 15e facing each other and connects them. As shown in FIGS. 2 and 3, two engaging sections 15e to which one flexible connecting section 15f connects are arranged opposite to each other and become a pair and the pair of engaging sections 15e is arranged with respect to each of both sides of the air-blowing guide 15.

More specifically, the engaging section 15e is arranged and extended in the same direction of the hot air guide tube 15a and connects the regulating member 15b and the support member 15c, or the support members 15c to each other. Thus, the engaging sections 15e that are provided in the same side of the air-blowing guide 15 are connected to each other and become pairs by the flexible connecting sections 15f that are variedly arranged in plurality (three) in the extending direction of the engaging sections 15e.

Figure 4:
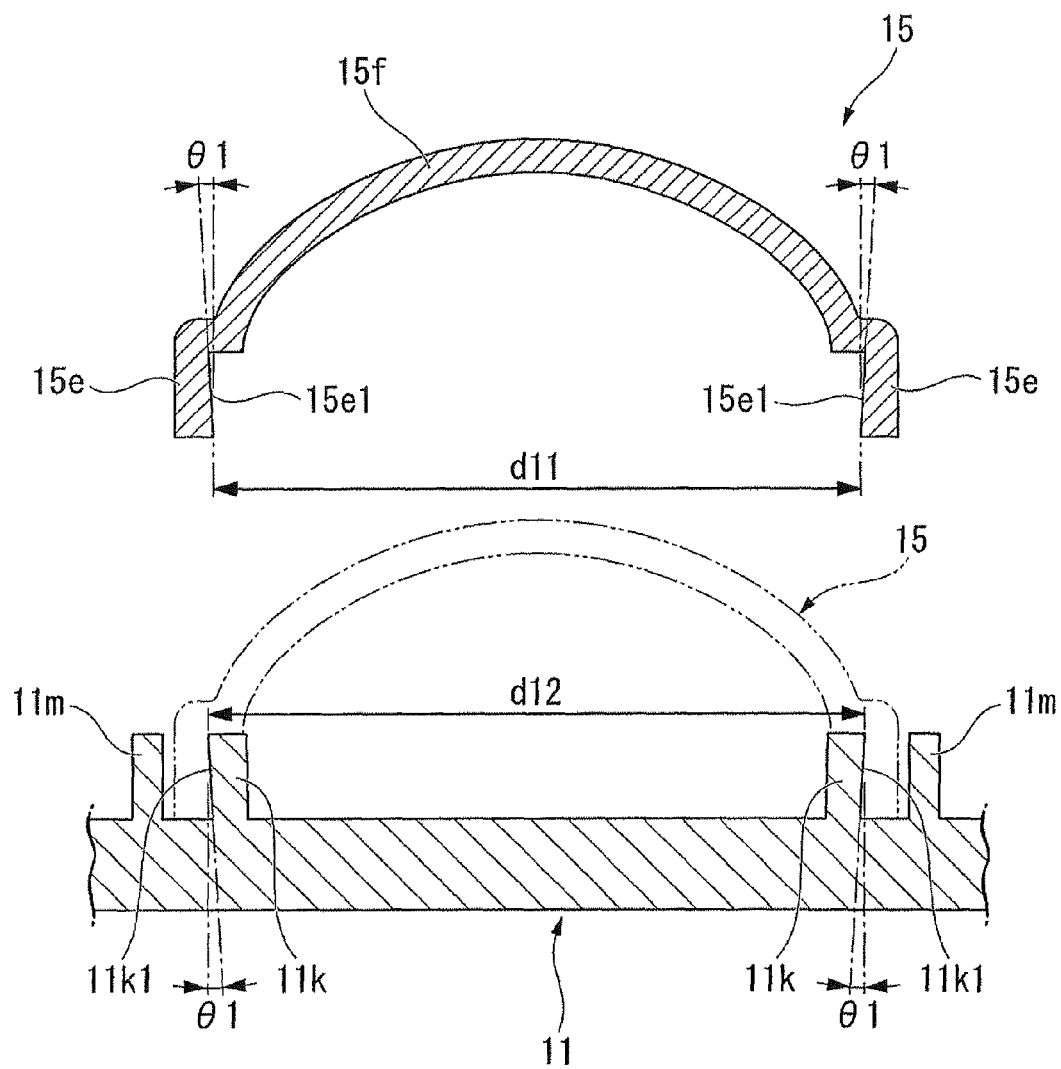
FIG. 4 is a cross sectional view taken along a line A-A of FIG. 1.

As shown in FIG. 4 that is a cross sectional view taken along a line A-A of FIG. 1, a protrusion 11k as a portion of the case 11 is provided in the interior wall of the case 11. The protrusion 11k is formed to extend in the same direction as the engaging section 15e and provided in twos spaced apart in the same direction as a pair of the engaging sections 15e. Two protrusions 11k are a pair.

As shown in FIG. 4, each of the engaging sections 15e is engaged at the outside of each of the protrusions 11k. In the air conditioner for a vehicle S11 according to the embodiment, a minimum interval d11 between insides (contact sides with the protrusion 11k) of a pair of the engaging sections 15e to each other is set slightly smaller than the minimum interval d12 between outsides (contact sides with the engaging section 15e) of a pair of the protrusion 11k to each other. Thus, in a case where the engaging section 15e is engaged with the protrusion 11k, the flexible connecting section 15f is elastically deformed.

Also, a contacting surface 15e1 of the engaging section 15e that contacts the protrusion 11k and a contacting surface 11k1 of the protrusion 11k that contacts the engaging section 15e are inclined by a degree θ1 toward the relative movement direction of the engaging section 15e itself when the engaging section 15e is detached from an engaged state with the protrusion 11k. In other words, when the engaging section 15e is detached, the contacting surface 15e1 of the engaging section 15e is relatively moved to upward in FIG. 4, so that it is inclined upward by the degree θ1. When the engaging section 15e is detached, the contacting surface 11k1 of the protrusion 11k is moved relatively downward in FIG. 4, so that it is inclined downward by the degree θ1.

As a method to incline the contacting surfaces 15e1 and 11k1 as described above, there is a method in which an injection molding is performed using an insertable and removable die in a direction vertical to the paper surface of FIG. 4, or a method in which machining is performed after the injection molding. Also, there is a method in which the shape of the case 11 or the air-blowing guide 15, or the cooling environment is set so as to incline the contacting surfaces 15e1 and 11k1 in a desired direction by contracting them in cooling process after the injection molding using the insertable and removable die in the vertical direction of FIG. 4.

The flexible connecting section 15f has an arc shape and is formed by a flexible resin the same as the other configuration of the case 11 and the air-blowing guide 15. Thus, in the air conditioner for a vehicle S11 according to the embodiment, the arc is elastically deformed so as to be opened when the engaging section 15e is engaged with the protrusion 11k.

As shown in FIG. 4, the case 11 has a mound section 11m that is arranged outside of the engaging section 15e. The mound section 11m suppress a variation with time of the flexible connecting section 15f by contacting the outside of the engaging section 15e when the air-blowing guide 15 is exposed to a high temperature environment over a long time so that the flexible connecting section 15f varies with time in the arc opening direction. Also, the mound section 11m is arranged having a small gap with respect to the engaging section 15e when the engaging section 15e is engaged with the protrusion 11k.

As shown in FIG. 1, the mound section 11m is provided with respect to each of the engaging sections 15e and pinches and arranges the engaging section 15e with the protrusion 11k. Thus, as shown in FIG. 1, the mound sections 11m are variedly arranged in plurality (three) in the extension direction of the engaging section 15e.

As described above, the air conditioner for a vehicle S11 of the embodiment includes a pair of engaging sections 15e that are included in the air-blowing guide 15, are connected by the flexible connecting section 15f that is included in the air-blowing guide 15 and are arranged facing each other, and the protrusion 11k that is projected from the interior wall of the case 11 and in which the engaging section 15e can be engaged in the state where the flexible connecting section 15f is elastically deformed.

Returning to FIG. 1, the mode damper 16 for the defroster vent outlet is a damper that performs opening and closing of the defroster vent outlet 11d and is rotatable within the case 11.

The mode damper 17 for the face vent outlet is a damper that performs opening and closing of the face vent outlet 11e and is rotatable within the case 11.

The mode damper 18 for the foot vent outlet is a damper that performs opening and closing of the foot vent outlet 11f and is rotatable within the case 11.

A motor (not shown) supplies power to the air mix damper apparatus 13, the mode damper 16 for the defroster vent outlet, the mode damper 17 for the face vent outlet, and the mode damper 18 for the foot vent outlet.

According to the air conditioner for a vehicle S11 of the embodiment having the above-described configuration, in a case where both of the opening 11h for cool air and the opening 11i for heating are opened by the air mix damper apparatus 13, the air that is supplied to the cooling flow passage 11a is cooled by the evaporator 12, becomes cool air and then a portion of the cool air is supplied to the heating flow passage 11b.

Thus, the hot air that is heated and generated by the heater core 14 at the heating flow passage 11b is supplied to the mixing section 11c from the opening 11g for hot air. The cool air that is not supplied to the heating flow passage 11b is supplied to the mixing section 11c from the opening 11h for cool air.

The cool air and the hot air that are supplied to the mixing section 11c are guided to the air-blowing guide 15, mixed, and then supplied to the inside of the vehicle through any one of openings of the defroster vent outlet 11d, the face vent outlet 11e, and the foot vent outlet 11f.

As described above, when the air conditioner for a vehicle S11 of the embodiment is assembled, the evaporator 12, the air mix damper apparatus 13, the heater core 14, the air-blowing guide 15, the mode damper 16 for the defroster vent outlet, the mode damper 17 for a face vent outlet, and the mode damper 18 for the foot vent outlet are provided with respect to one side of a dividing piece of the case 11 that is divided in two in a direction vertical to the paper surface of FIG. 1. After that, a process for attaching the other side of the dividing piece is performed.

Here, the air conditioner for a vehicle S11 of the embodiment includes a pair of engaging sections 15e that are included in the air-blowing guide 15, are connected by the flexible connecting section 15f that is included in the air-blowing guide 15 and are arranged facing each other, and the protrusion 11k that is projected from the interior wall of the case 11 and in which the engaging section 15e is engaged in the state where the flexible connecting section 15f is elastically deformed.

Accordingly, the flexible connecting section 15f that connects the engaging sections 15e to each other is elastically deformed and the engaging section 15e is engaged with the protrusion 11k so that the engaging section 15e and the protrusion 11k are strongly pressed to each other by a restoring force of the flexible connecting section 15f. As a result, the air-blowing guide 15 is fixed to the case 11.

As described above, according to the air conditioner for a vehicle S11 of the embodiment, because the air-blowing guide 15 can be fixed to the case 11, the air-blowing guide 15 can be prevented from being left out when the air conditioner for a vehicle S11 that includes other parts such as the evaporator 12, the heater core 14 or the like when assembled.

According to the air conditioner for a vehicle S11 of the embodiment, in the air conditioner for a vehicle including the air-blowing guide, the air-blowing guide is prevented from being left out when assembled and the assemblability can be enhanced.

Also, according to the air conditioner for a vehicle S11 of the embodiment, the contacting surfaces 15e1 and 11k1 of the engaging section 15e and the protrusion 11k are inclined toward their relative movement directions when the engaging section 15e is detached from the protrusion 11k.

In other words, in the state where the engaging section 15e is engaged with the protrusion 11k, the engaging section 15e is drawn to the protrusion 11k and the air-blowing guide 15 can be more strongly fixed with respect to the case 11.

Furthermore, when the engaging section 15e is engaged with the protrusion 11k, in other words, when the air-blowing guide 15 is attached to the case 11, as described above, the contacting surfaces 15e1 and 11k1 of the engaging section 15e and the protrusion 11k are inclined, and the air-blowing guide 15 approaches to the case 11 so that the engaging section 15e is pressed into contact with the protrusion 11k and is widened. When the air-blowing guide 15 reaches a fixed portion, the engaging section 15e is quickly returned to the case 11. At this time, a sound "click" is generated as the engaging section 15e contacts the protrusion 11k. Accordingly, it can be confirmed by the sound that the air-blowing guide 15 is correctly fixed to the case 11.

Also, in the air conditioner for a vehicle S11 of the embodiment, the flexible connecting section 15f has an arc shape and the engaging section 15e is engaged with the side surface of the outside of the protrusion 11k. Thus, when the engaging section 15e is engaged with the protrusion 11k, the arc is elastically deformed to be opened.

As described above, the air-blowing guide 15 is made from the resin and formed by the injection molding. Accordingly, it is assumed that the air-blowing guide 15 contracts when it is cooled after the injection molding and the flexible connecting section 15f contracts in the direction in which the engaging sections 15e approach each other. Thus, the flexible connecting section 15f is arc shape and the engaging section 15e is engaged with the side surface of the outside of the protrusion 11k so that the pressing force of the engaging section 15e toward the protrusion 11k can be prevented from decreasing due to the sink according to the cooling of the flexible connecting section 15f.

Also, the air conditioner for a vehicle S11 of the embodiment includes the mound section 11m that suppresses the variation with time of the flexible connecting section 15f by contacting with the outside of the engaging section 15e.

Because the air-blowing guide 15 of the air conditioner for a vehicle S11 is heated by being exposed to the hot air during operation, the air-blowing guide 15 is exposed to the high temperature environment. Thus, the flexible connecting section 15f of the air-blowing guide 15 is changed over time such as to become extended (in other words, the arc is opened). However, according to the air conditioner for a vehicle S11 of the embodiment, the mound section 11m contacts the flexible connecting section 15f so that the deformation of the flexible connecting section 15f can be suppressed.

After assembling of the air conditioner for a vehicle S11, the engaging section 15e and the protrusion 11k are not necessarily engaged but when a gap between the engaging section 15e and the protrusion 11k is large, there is a concern that the air-blowing guide 15 will be rattled and then abnormal noise may be generated. According to the air conditioner for a vehicle S11 of the embodiment, the deformation of the flexible connecting section 15f can be suppressed and the gap between the engaging section 15e and the protrusion 11k can be prevented from increasing. Thus, the air-blowing guide 15 is prevented from rattling.

As described above, the preferred embodiment of the present invention has been described with reference to the drawings, however the present invention is not limited to the above-described embodiments. All shapes, assemblies or the like of each of the configurations illustrated in the above-described embodiments are examples of the present invention, and various modifications may be performed on the basis of the demands of the design or the like without departing from the scope of the present invention.

For example, in the above-described embodiment, the configuration is described in which the flexible connecting section 15f has the arc shape and the engaging section 15e is engaged with the outside of the protrusion 11k.

However, the present invention is not limited to this configuration; the flexible connecting section 15f does not need to have the arc shape and for example, may also have a U shape. Furthermore, the flexible connecting section 15f may also be engaged in the inside of the protrusion 11k.

In the embodiment, the description was given regarding the configuration in which the engaging sections 15e are provided at both sides of the air-blowing guide 15.

However, the present invention is not limited to the configuration; in a case where the dividing piece of the case 11 in which the air-blowing guide 15 is first attached is decided beforehand when assembling the air conditioner for a vehicle S11, the engaging section 15e may be provided only at the side that is fixed at the dividing piece of the case 11. In this case, the installation place of the protrusion 11k may also be at only one side.

In the above-described embodiment, the description was given regarding the configuration in which the flexible connecting sections 15f are variedly arranged in plurality (three) along the extension direction of the engaging section 15e.

However, the present invention is not limited to the configuration, and a configuration in which the flexible connecting sections 15f are connected continuously in the extension direction of the engaging section 15e can be employed.

In the above-described embodiment, the description was given regarding the configuration in which the contacting surfaces 15e1 and 11k1 of the engaging section 15e and the protrusion 11k are inclined toward each other.

However, the present invention is not limited to this configuration, and a configuration in which any one of the contacting surfaces 15e1 and 11k1 of the engaging section 15e and the protrusion 11k is inclined can be employed.

(2) Second Embodiment

Hereinafter, description regarding the air conditioner for a vehicle according to the second embodiment of the present invention will be made with reference to drawings. In the drawings, each of the members is appropriately suitably scaled to make it be of identifiable size.

Figure 5:
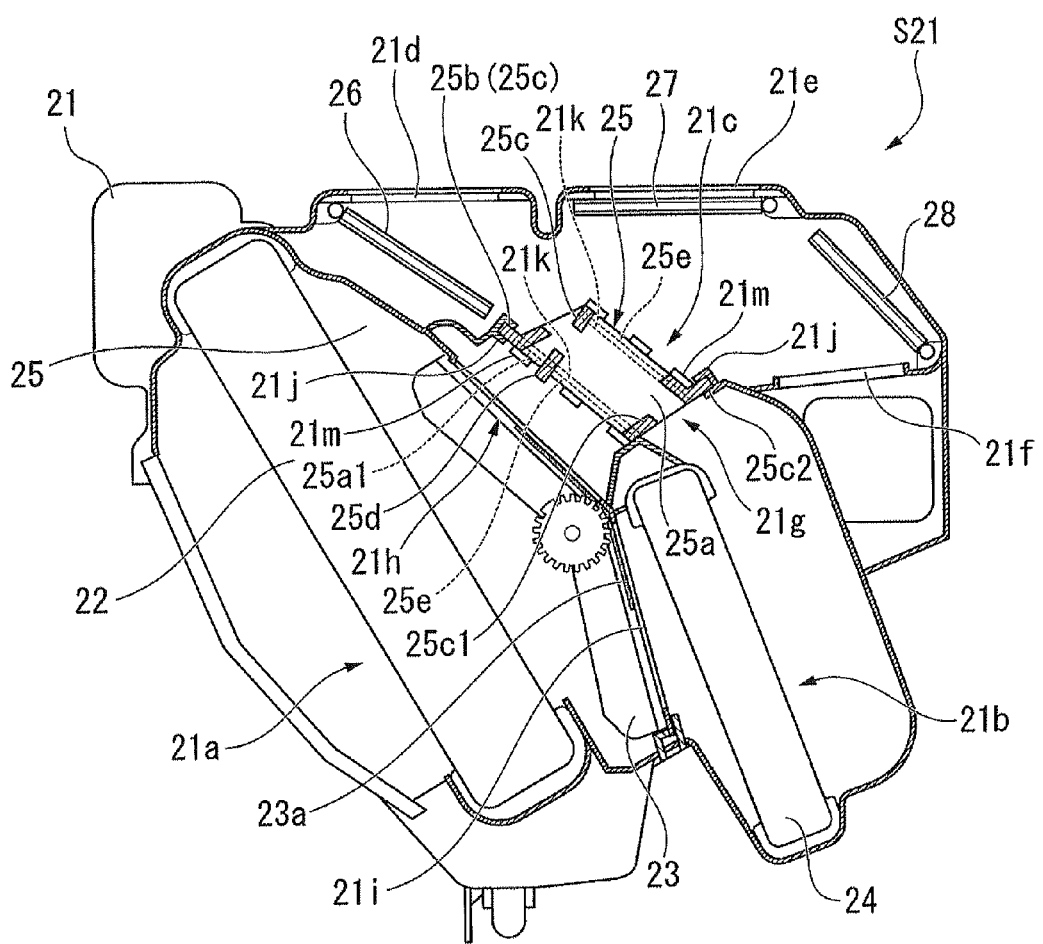
FIG. 5 is a cross sectional view schematically showing a configuration of the air conditioner for a vehicle according to a second embodiment of the present invention.

FIG. 5 is a cross sectional view schematically showing a configuration of the air conditioner for a vehicle S21 (HVAC: Heating Ventilation Air Conditioning) according to the second embodiment of the present invention. As shown in FIG. 5, the air conditioner for a vehicle S21 according to the embodiment includes a case 21, an evaporator 22, an air mix damper apparatus 23, a heater core 24, an air-blowing guide 25, a mode damper 26 for a defroster vent outlet, a mode damper 27 for the face vent outlet, and a mode damper 28 for a foot vent outlet.

The case 21 is formed an outer shape of the air conditioner for a vehicle S21 according to the embodiment. A cooling flow passage 21a in which the evaporator 22 is provided, a heating flow passage 21b in which the heater core 24 is provided, and a mixing section 21c in which cool air (a first airflow) and hot air (a second airflow) are mixed and become conditioned air are disposed within the case 21. Also, a plurality of vent outlets (a defroster vent outlet 21d, a face vent outlet 21e and a foot vent outlet 21f) that is exposed to the outside and is connected to the mixing section 21c (a mixing region) is provided in the case 21.

The defroster vent outlet 21d is an opening to supply the conditioned air with respect to a window shield. The face vent outlet 21e is an opening to supply the conditioned air with respect to the face of the occupant. The foot vent outlet 21f is an opening to supply the conditioned air with respect to the feet of the occupant.

As shown in FIG. 5, an opening 21g for hot air that supplies the hot air to the mixing section 21c from the heating flow passage 21b in which the heater core 24 is provided, an opening 21h for cool air that supplies the cool air to the mixing section 21c from the cooling flow passage 21a in which the evaporator 22 is provided, and an opening 21i for heating that supplies the cool air to the heating flow passage 21b from the cooling flow passage 21a are provided in the case 21.

The evaporator 22 is a part of a refrigeration cycle that is mounted on the vehicle and is arranged within the cooling flow passage 21a. The evaporator 22 cools air that is supplied in the cooling flow passage 21a by a blower (not shown) and then generates the cool air.

The air mix damper apparatus 23 is arranged on the downstream side of the evaporator 22 and regulates the amount of the cool air that is generated by the evaporator 22 to the heating flow passage 21b. More specifically, the air mix damper apparatus 23 includes an air mix damper 23a that is freely slidable between the opening 21h for cool air and the opening 21i for heating. The opening ratio between the opening 21h for cool air and the opening 21i for heating can be regulated by the air mix damper 23a. Accordingly, the cool air supply amount to the heating flow passage 21b can be regulated. As a result, a mixing ratio between the cool air and the hot air in the mixing section 21c can be regulated so that the temperature of the conditioned air can be regulated.

The heater core 24 is arranged within the heating flow passage 21b and heats the cool air that is supplied through the opening 21i for heating so that the heater core 24 generates the hot air.

The air-blowing guide 25 is provided in the mixing section 21c that is a mixing region of the hot air and the cool air within the case and guides the hot air and the cool air.

Figure 6:
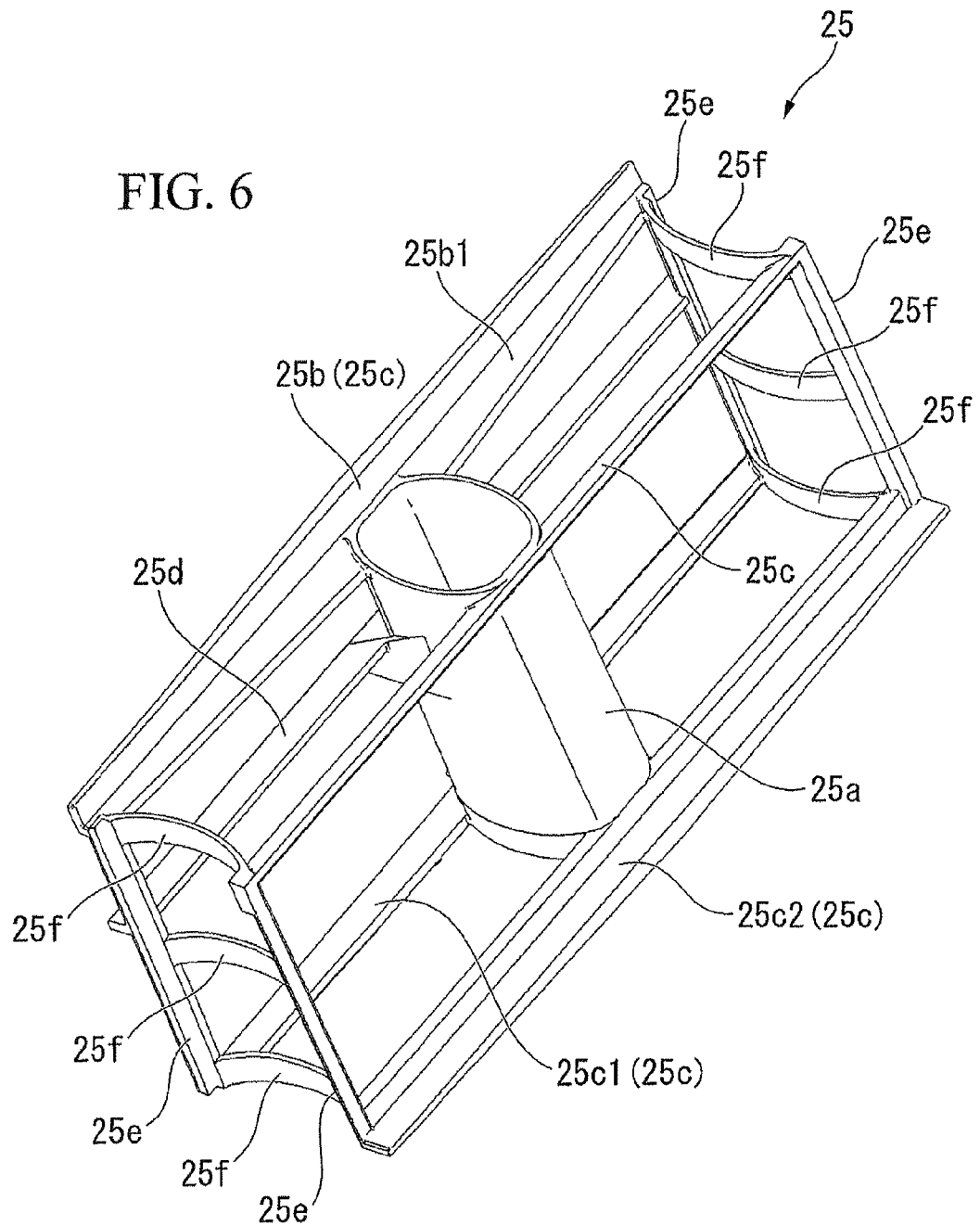
FIG. 6 is a perspective view showing the air-blowing guide that is included in the air conditioner for a vehicle according to the second embodiment seen from a side opposite an opening for cool air that is provided within the case.
Figure 7:
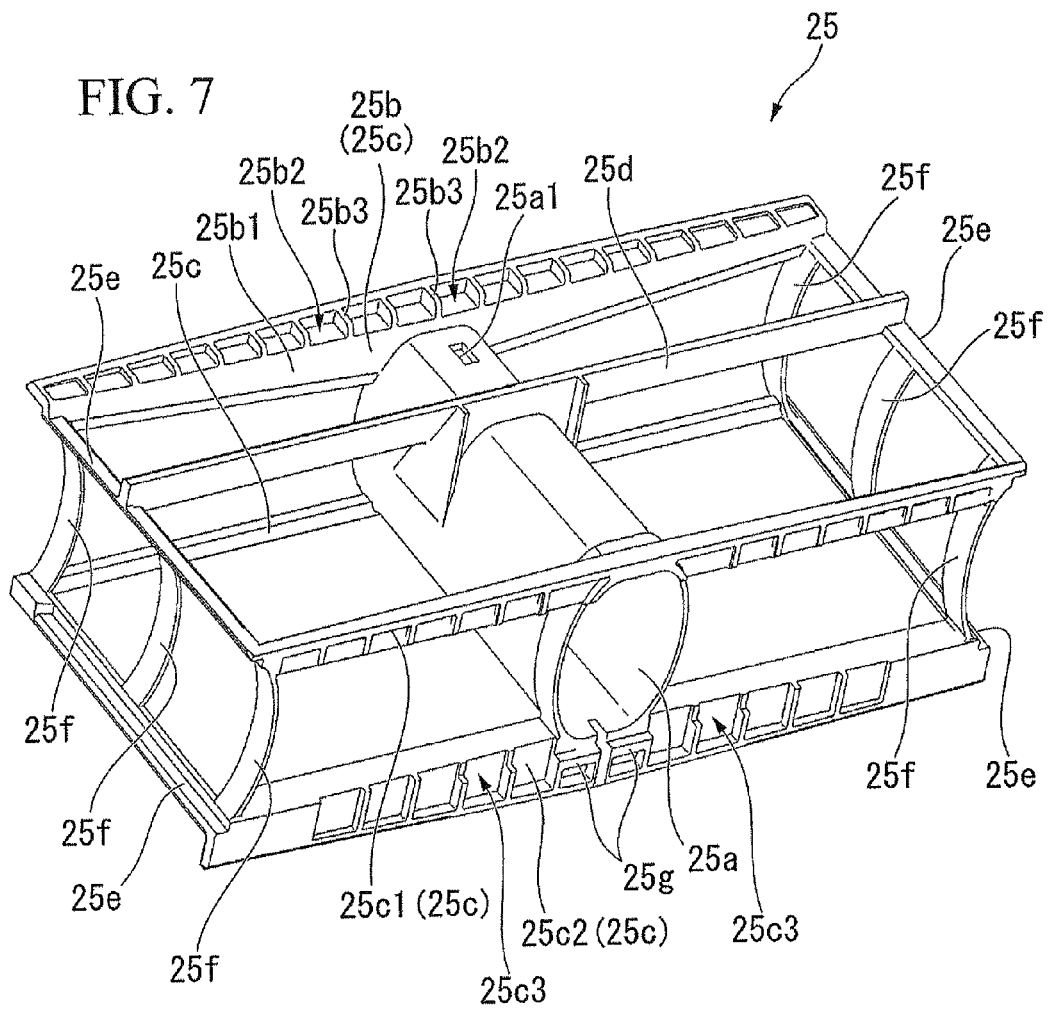
FIG. 7 is a perspective view showing the air-blowing guide that is included in the air conditioner for a vehicle according to the second embodiment seen from a side of the opening for cool air that is provided within the case.

FIGS. 6 and 7 are perspective views of the air-blowing guide 25. FIG. 6 is a perspective view seen from a side opposite to the opening 21h for cool air. FIG. 7 is a perspective view seen from a side of the opening 21h for cool air. As shown in the drawings, the air-blowing guide 25 includes a hot air guide tube 25a, a regulating member 25b, a support member 25c (a support member), an adjusting member 25d, an engaging section 25e and a flexible connecting section 25f.

The hot air guide tube 25a is a straight tube shape member that guides a portion of the hot air that is supplied to the mixing section 21c from the opening 21g for hot air to the defroster vent outlet 21d without mixing with the cool air. One opening end of the hot air guide tube 25a is connected to the opening 21g for hot air and the other opening end is arranged so as to face the defroster vent outlet 21d.

As shown in FIG. 7, a cool air introduction opening 25a1 for introducing the cool air to the hot air guide tube 25a is formed at a portion which is close to the regulating member 25b and is a surface of the opening 21h for cool air side of the hot air guide tube 25a. As described above, the hot air guide tube 25a is formed so as to introduce a portion of the cool air that is supplied to the mixing section 21c from the opening 21h for cool air in the hot air guide tube 25a. Thus, even in a case where the air mix damper 23a slightly opens the opening 21h for cool air, the cool air introduction opening 25a1 is disposed in the vicinity of the upper portion (a side that the opening 21h for cool air begins to open) of the hot air guide tube 25a whereby the cool air is introduced into the hot air guide tube 25a.

The regulating member 25b directs the air blow direction of the cool air that is supplied to the mixing section 21c from the opening 21h for cool air toward the opening 21g for hot air such that the region 25b1 that is opposite to the opening 21h for cool air is inclined toward the opening 21g for hot air.

The regulating member 25b regulates a flow rate distribution of the cool air that is supplied to the mixing section 21c from the opening 21h for cool air according to the flow rate distribution of the hot air that is supplied to the mixing section 21c from the opening 21g for hot air such that the width of an region 25b1 that is inclined is changed in an extension direction of the regulating member 25b.

In the air conditioner for a vehicle S21 according to the embodiment, a flow rate distribution of the hot air that is supplied to the mixing section 21c is biased toward the both ends in horizontal direction.

Figure 8:
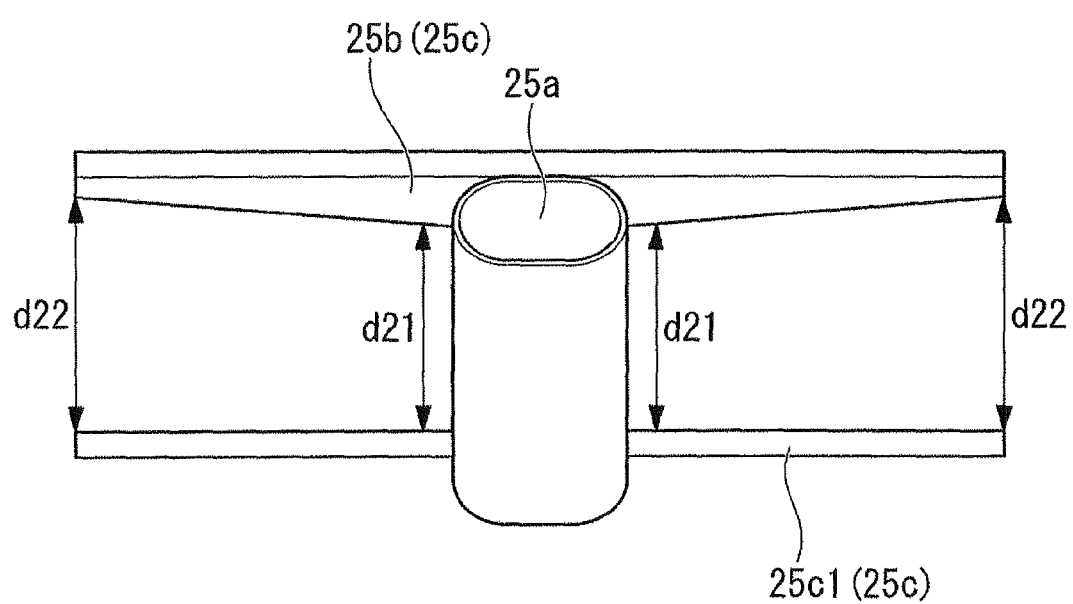
FIG. 8 is a schematic diagram showing the air-blowing guide that has a regulating member 25*b* and is included in the air conditioner for a vehicle according to the second embodiment.

Thus, the inclined region 25b1 of the regulating member 25b is shaped such that the width of the inclined region 25b1 becomes gradually wider toward the center from both ends. In other words, as shown in FIG. 8, the flow passage width d21 of the center portion of the regulating member 25b is set narrower than the flow passage width d22 of the end so that the flow passage width of the cool air is changed and thus the flow rate distribution of the cool air is adjusted.

As described above, the flow rate distribution of the cool air is adjusted by the regulating member 25b such that the flow rate of the cool air that is supplied to the mixing section 21c from the horizontal direction center portion of the opening 21h for cool air is smaller than the flow rate of the cool air that is supplied to the mixing section 21c from the horizontal direction end portion of the opening 21h for cool air. As a result, the balance of the flow rates between hot air and cool air is in accordance with each other in the mixing section 21c.

Also, the regulating member 25b is formed such that the center portion is thicker than the end portion in the extension direction in appearance. In a case where the thickness of the regulating member 25b is different in the extension direction, the deformation amounts due to the heat are different to each other according to the position on the regulating member 25b and this leads to sink of the regulating member 25b. Thus, in the air conditioner for a vehicle S21 according to the embodiment, as shown in FIG. 7, a thickness extraction region 25b2 is formed in the rear surface of the regulating member 25b such that the thickness may be uniformized in the extension direction of the regulating member 25b. A depth of the center portion is set to be deeper than that of the end portion of the thickness extraction region 25b2. Thus, the thickness of the regulating member 25b is uniformized in the extension direction of the regulating member 25b.

As shown in FIG. 7, in the air conditioner for a vehicle S21 according to the embodiment, in order to secure the stiffness of the regulating member 25b, the thickness extraction regions 25b2 are variedly formed at various places so as to leave ribs 25b3.

Also, the regulating member 25b has a function as the support member 25c that functions as a frame that supports the shape of the air-blowing guide 25 itself. In other words, in the air conditioner for a vehicle S21 according to the embodiment, the regulating member 25b is integrally formed with one support member 25c.

As described above, the support member 25c is integrally formed with the regulating member 25b and is connected to each of four corners of the hot air guide tube 25a so as to function as the frame that supports the shape of the air-blowing guide itself. Also, as shown in FIGS. 6 and 7, the support member 25c and the regulating member 25b are arranged in parallel to each other. The support member 25c that is integrally formed with the regulating member 25b is arranged on an upper end (an end of the opening 21h for cool air away from the opening 21g for hot air) of the opening 21h for cool air. One support member 25c (a first support member 25c1) is arranged on a lower end (an end of the opening 21h for cool air close to the opening 21g for hot air) of the opening 21h for cool air. One support member 25c (a second support member 25c2) is arranged in an end of the opening 21g for hot air away from the opening 21h for cool air.

Also, as shown in FIG. 5, each of fitting grooves 21j that is extended in the vertical direction of the paper surface at the upper end (the end of the opening 21h for cool air away from the opening 21g for hot air) of the opening 21h for cool air, and an end of the opening 21g for hot air away from the opening 21h for cool air. The regulating member 25b and the second support member 25c2 are fitted at the fitting groove 21j so that the positioning of the air-blowing guide 25 is performed.

In the air conditioner for a vehicle S21 according to the embodiment, as shown in FIG. 7, the second support member 25c2 that is fitted at the fitting groove 21j and is disposed at the side of the opening 21g for hot air in which the hot air is supplied to the mixing section 21c includes the reinforcing ribs 25g that are extended in the extension direction (in other words, the direction that is orthogonal to the flow direction of the hot air that passes through the opening 21g for hot air) of the second support member 25c2.

The reinforcing ribs 25g are disposed at the center portion of the second support member 25c2. Accordingly, the center portion of the second support member 25c2 is reinforced.

As shown in FIG. 7, thickness extraction regions 25c3 are formed in rear surfaces of the first support member 25c1 and the second support member 25c2 similar to the regulating member 25b.

The adjusting member 25d is arranged horizontally at the opening 21h for cool air. In other words, the adjusting member 25d is arranged in parallel with the support member 25c at the opening 21h for cool air. The adjusting member 25d adjusts the cool air that is supplied to the mixing section 21c from the opening 21h for cool air so that vortex is prevented from being generated. Accordingly, flow noise is prevented from being generated.

The engaging section 25e is engaged to the case 21 so that the air-blowing guide 25 is fixed to the case 21. Also, the flexible connecting section 25f arranges two engaging sections 25e to face to each other and connects them. The flexible connecting section 25f has circular arc shape and is formed from resin having flexibility similar to the other configuration of the case 21 and the air-blowing guide 25.

Return to FIG. 5, the mode damper 26 for the defroster vent outlet is a damper that performs opening and closing of the defroster vent outlet 21d and is rotatable within the case 21.

The mode damper 27 for the face vent outlet is a damper that performs opening and closing of the face vent outlet 21e and is rotatable within the case 21.

The mode damper 28 for the foot vent outlet is a damper that performs opening and closing of the foot vent outlet 21f and is rotatable within the case 21.

A motor (not shown) supplies power to the air mix damper apparatus 23, the mode damper 26 for the defroster vent outlet, the mode damper 27 for the face vent outlet, and the mode damper 28 for the foot vent outlet.

According to the air conditioner for a vehicle S21 of the embodiment having the above-described configuration, in a case where both of the opening 21h for cool air and the opening 21i for heating are opened by the air mix damper apparatus 23, the air that is supplied to the cooling flow passage 21a is cooled by the evaporator 22, becomes cool air and then a portion of the cool air is supplied to the heating flow passage 21b.

Thus, the hot air that is heated and generated by the heater core 24 at the heating flow passage 21b is supplied to the mixing section 21c from the opening 21g for hot air. The cool air that is not supplied to the heating flow passage 21b is supplied to the mixing section 21c from the opening 21h for cool air.

The cool air and the hot air that are supplied to the mixing section 21c are guided to the air-blowing guide 25 and mixed, and then supplied within the vehicle through any one of openings of the defroster vent outlet 21d, the face vent outlet 21e, and the foot vent outlet 21f.

In the air conditioner for a vehicle S21 according to the embodiment, the air-blowing guide 25 includes the regulating member 25b which regulates the flow rate distribution of the cool air toward the mixing section 21c according to the flow rate distribution of the hot air toward the mixing section 21c.

According to the air conditioner for a vehicle S21 of the embodiment, the flow rate distribution of the cool air toward the mixing section 21c is regulated according to the flow rate distribution of the hot air toward the mixing section by the regulating member 25b. As a result, the balance of the flow rates between hot air and cool air is in accordance with each other so that the hot air and the cool air can be evenly mixed without extracting the cool air from the mixing section 21c.

According to the air conditioner for a vehicle S21 of the embodiment, in the air conditioner having the air-blowing guide, the temperature of the conditioned air can be better optimized than that of the conventional air conditioner.

Also, in the air conditioner for a vehicle S21 according to the embodiment, the regulating member 25b is integrally formed with the support member 25c. Thus, the regulating member 25b is not necessary to be installed separately so that the number of members in the air-blowing guide 25 is not increased.

Also, in the air conditioner for a vehicle S21 according to the embodiment, the thickness extraction regions 25b2 that makes the thickness to be uniformized in the extension direction of the regulating member 25b is included.

Thus, the deformation of the regulating member 25b due to the heat can be suppressed and the temperature of the conditioned air can be better optimized than that of the conventional air conditioner over a longer period of time.

Also, in the air conditioner for a vehicle S21 according to the embodiment, the air-blowing guide 25 is fixed at the opening 21g for hot air side and simultaneously includes the second support member 25c2 of which the center portion is reinforced in the extension direction.

Thus, the second support member 25c2 is prevented from being bent due to the long-term aging in the high temperature environment and a portion of the hot air is prevented from being leaked without passing through the mixing section 21c unintentionally.

According to the air conditioner for a vehicle S21 of the embodiment, in the air conditioner for a vehicle having the air-blowing guide, the temperature of the conditioned air can be better optimized than that of the conventional air conditioner.

Also, in the air conditioner for a vehicle S21 according to the embodiment, the second support member 25c2 is reinforced in the center portion by the reinforcing ribs 25g that are extended in the direction orthogonal to the flow direction of the hot air that passes through the opening 21g for hot air.

Thus, even if the second support member 25c2 is deformed, the reinforcing ribs 25g prevent the hot air that is to be leaked, so that the leakage of hot air can be reliably suppressed.

Also, in the air conditioner for a vehicle S21 according to the embodiment, the air-blowing guide 25 includes the hot air guide tube 25a that guides a portion of the hot air without mixing the cool air at the mixing section 21c and the cool air introduction opening 25a1 that is opened to the hot air guide tube 25a, and introduces a portion of the cool air into the hot air guide tube 25a.

Thus, it is possible to suppress a phenomenon whereby the temperature at the outlet side of the hot air guide tube 25a is too high.

According to the air conditioner for a vehicle S21 of the embodiment, in the air conditioner having the air-blowing guide, the temperature of the conditioned air can be better optimized than that of the conventional air conditioner.

As described above, the preferred embodiment of the present invention has been described with reference to the drawings, however the present invention is not limited to the above-described embodiments. All shapes, assemblies or the like of each of the configurations illustrated in the above-described embodiments are examples of the present invention, and various modifications may be performed on the basis of the demands of the design without departing from the gist of the present invention.

In the above-described embodiment, for example, description has been given regarding the configuration that the flow rate distribution regulating section of the present invention is the regulating member 25b.

However, the present invention is not limited to the above-described embodiment, and a configuration in which a separate member or protrusion section from the regulating member 25b is provided as the flow rate distribution regulating section of the present invention can be employed.

Also, in the above-described embodiment, description has been given regarding the configuration that the regulating member 25b that is the flow rate distribution regulating section of the present invention is integrally formed with the support member 25c.

However, the present invention is not limited to the above-described embodiment, and a configuration in which the regulating member 25b is provided separately from the support member 25c can be employed.

Also, in the above-described embodiment, description has been given regarding the configuration that the reinforcing ribs 25g are extended in the direction that is orthogonal to the flow direction of the hot air that passes through the opening 21g for hot air.

However, the present invention is not limited to the above-described embodiment, and a configuration in which the reinforcing ribs 25g are extended in the flow direction of the hot air that passes through the opening 21g for hot air can be employed.

Also, in the above-described embodiment, description has been given regarding the configuration in which the center portion of the second support member 25c2 is reinforced by the reinforcing ribs 25g that are extended in the direction that is orthogonal to the flow direction of the hot air that passes through the opening 21g for hot air.

However, the present invention is not limited to the above-described embodiment, and a configuration in which the other support member 25c is reinforced by the reinforcing ribs at the center portion. Thus, the deformation of the support member 25c in which the reinforcing ribs is provided can be suppressed and can appropriately guide the cool air and the hot air.

Also, in the above-described embodiment, description has been given regarding the configuration in which the first airflow is the cool air and the second airflow is the hot air.

However, the present invention is not limited to the above-described embodiment, and a configuration in which the first airflow is the hot air and the second airflow is the cool air can be employed. Moreover, two airflows that guide airflow routes having the same or different temperatures may be the first airflow and the second airflow.

(3) Third Embodiment

Hereinafter, description will be made regarding the air conditioner for a vehicle according to the third embodiment of the present invention with reference to drawings. In the drawings, each scale of the members is appropriately changed to be a identifiable size.

Figure 9:
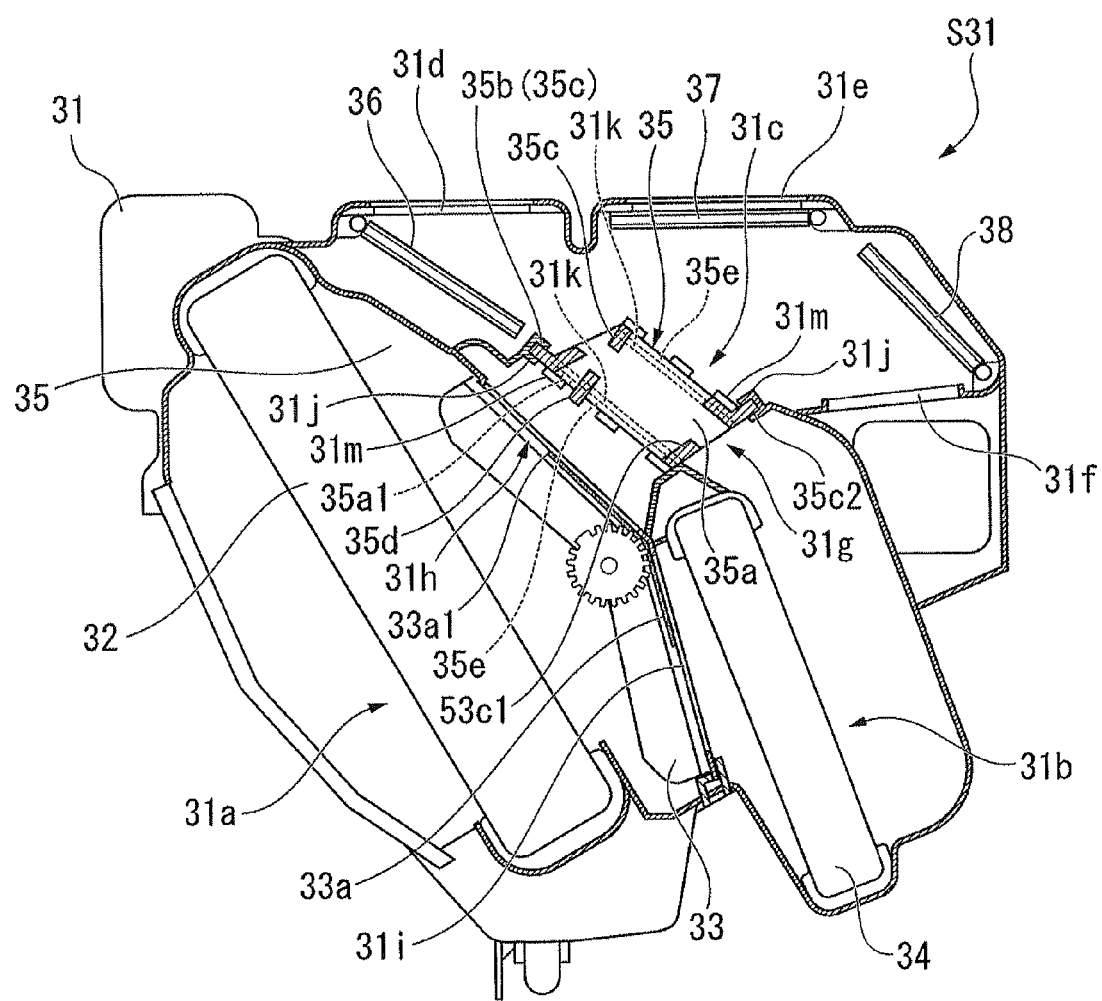
FIG. 9 is a cross sectional view schematically showing a configuration of the air conditioner for a vehicle according to a third embodiment of the present invention.

FIG. 9 is a cross sectional view schematically showing a configuration of the air conditioner S31 for a vehicle (HVAC: Heating Ventilation Air Conditioning) according to the third embodiment of the present invention. As shown in FIG. 9, the air conditioner S31 for a vehicle according to the embodiment includes a case 31, an evaporator 32, an air mix damper apparatus 33, a heater core 34, an air-blowing guide 35, a mode damper 36 for a defroster vent outlet, a mode damper 37 for a face vent outlet, and a mode damper 38 for a foot vent outlet.

The case 31 is formed an outer shape of the air conditioner S31 for a vehicle according to the embodiment. A cooling flow passage 31a in which the evaporator 32 is provided, a heating flow passage 31b in which the heater core 34 is provided, and a mixing section 31c in which cool air (a first airflow) and hot air (a second airflow) are mixed and become conditioned air are disposed within the case 31. Also, a plurality of vent outlets (a defroster vent outlet 31d, a face vent outlet 31e and a foot vent outlet 31f) that is exposed to the outside and is connected to the mixing section 31c (a mixing region) is provided in the case 31.

The defroster vent outlet 31d is an opening to supply the conditioned air with respect to a window shield. The face vent outlet 31e is an opening to supply the conditioned air with respect to the face of the occupant. The foot vent outlet 31f is an opening to supply the conditioned air with respect to the feet of the occupant.

As shown in FIG. 9, an opening 31g (opening) for hot air that supplies the hot air to the mixing section 31c from the heating flow passage 31b in which the heater core 34 is provided, an opening 31h (opening) for cool air that supplies the cool air to the mixing section 31c from the cooling flow passage 31a in which the evaporator 32 is provided, and an opening 31i for heating that supply the cool air to the heating flow passage 31b from the cooling flow passage 31a are provided in the case 31.

In other words, the mixing section 31c is a region that mixes the hot air that is supplied from the opening 31g for hot air and the cool air supplied from the opening 31h for cool air.

The evaporator 32 is a part of a refrigeration cycle that is mounted on the vehicle and is arranged within the cooling flow passage 31a. The evaporator 32 cools air that is supplied in the cooling flow passage 31a by a blower (not shown) and then generates the cool air.

The air mix damper apparatus 33 is arranged on the downstream side of the evaporator 32 and regulates an amount of the cool air that is generated at the evaporator 32 to the heating flow passage 31b. More specifically, the air mix damper apparatus 33 includes an air mix damper 33a (slide damper) that is slidable between the opening 31h for cool air and the opening 31i for heating. An opening ratio between the opening 31h for cool air and the opening 31i for heating can be regulated by the air mix damper 33a. Accordingly, the cool air supply amount to the heating flow passage 31b can be regulated. As a result, a mixing ratio between the cool air and the hot air in the mixing section 31c can be regulated so that the temperature of the conditioned air can be regulated.

The heater core 34 is arranged within the heating flow passage 31b and heats the cool air that is supplied through the opening 31i for heating so that the heater core 34 generates the hot air.

The air-blowing guide 35 is provided in the mixing section 31c that is a mixing region of the hot air and the cool air within the case and guides the hot air and the cool air.

Figure 10:
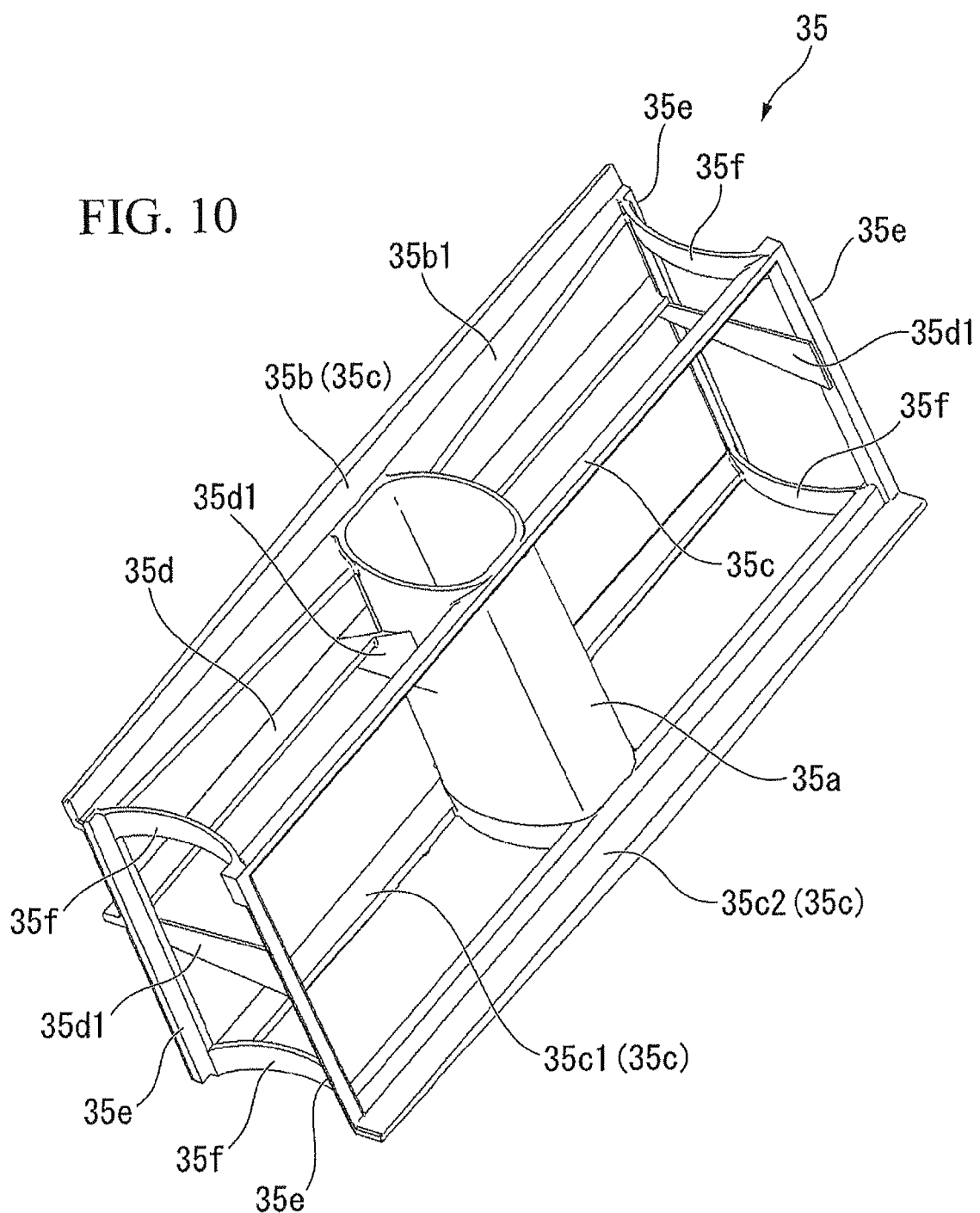
FIG. 10 is a perspective view showing the air-blowing guide that is included in the air conditioner for a vehicle according to the third embodiment seen from the side opposite of the opening for cool air that is provided within the case.
Figure 11:
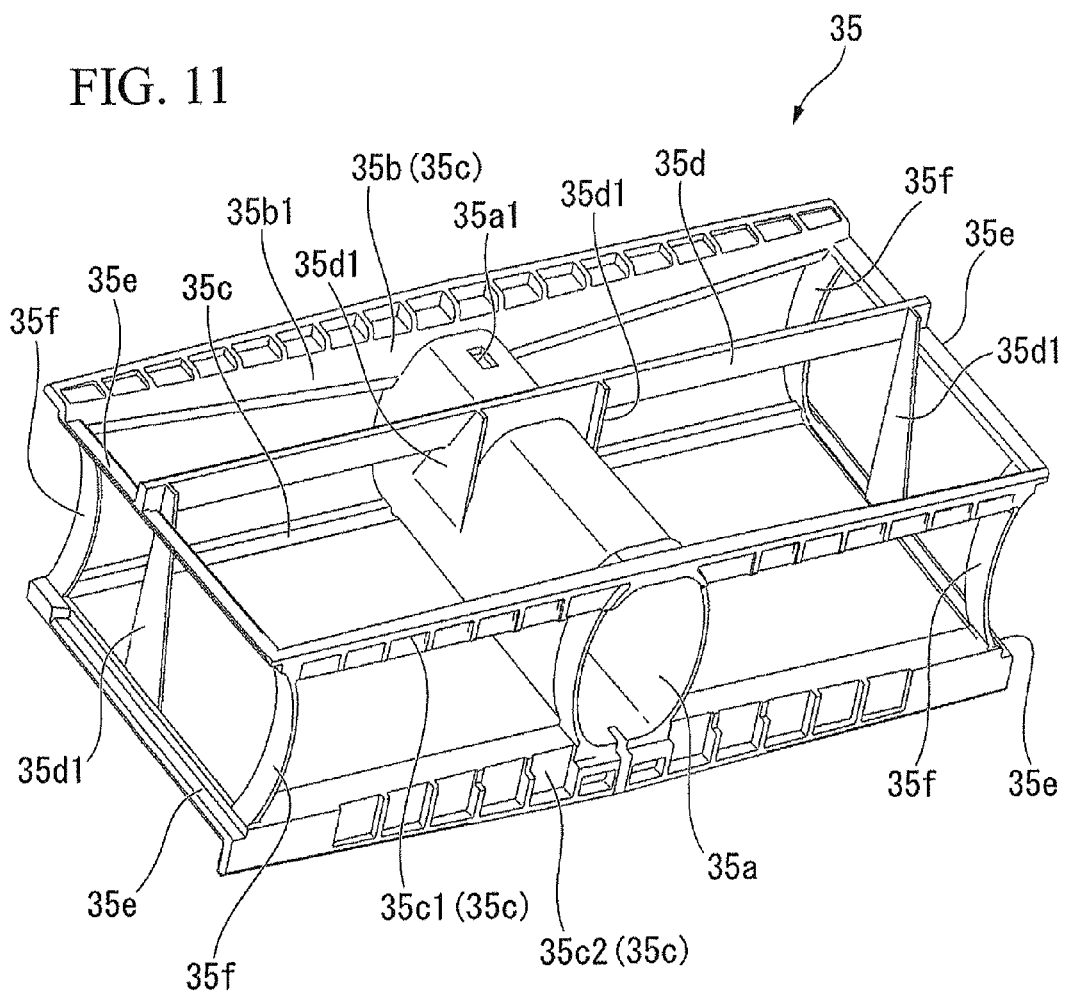
FIG. 11 is a perspective view showing the air-blowing guide that is included in the air conditioner for a vehicle according to the third embodiment seen from the side of the opening for cool air that is provided within the case.

FIGS. 10 and 11 are perspective views of the air-blowing guide 35. FIG. 10 is a perspective view seen from a side opposite to the opening 31h for cool air. FIG. 11 is a perspective view seen from a side of the opening 31h for cool air. As shown in the drawings, the air-blowing guide 35 includes a hot air guide tube 35a, a regulating member 35b, a support member 35c, an adjusting member 35d (an adjusting section), an engaging section 35e and a flexible connecting section 35f.

The hot air guide tube 35a is a straight tube shape member that guides a portion of the hot air that is supplied to the mixing section 31c from the opening 31g for hot air to the defroster vent outlet 31d without mixing with the cool air. One opening end of the hot air guide tube 35a is connected to the opening 31g for hot air and the other opening end is arranged so as to be directed to the defroster vent outlet 31d.

As shown in FIG. 11, a cool air introduction opening 35a1 for introducing the cool air to the hot air guide tube 35a is formed at a portion which is close to the regulating member 35b and a surface of the opening 31h for cool air side of the hot air guide tube 35a. As described above, the hot air guide tube 35a is formed so as to introduce a portion of the cool air that is supplied to the mixing section 31c from the opening 31h for cool air in the hot air guide tube 35a.

The regulating member 35b directs the air blow direction of the cool air that is supplied to the mixing section 31c from the opening 31h for cool air toward the opening 31g for hot air such that the inclined region 35b1 that is opposite to the opening 31h for cool air is inclined toward the opening 31g for hot air.

The regulating member 35b regulates a flow rate distribution of the cool air that is supplied to the mixing section 31c from the opening 31h for cool air according to the flow rate distribution of the hot air that is supplied to the mixing section 31c from the opening 31g for hot air such that the width of an inclined region 35b1 is changed in an extension direction of the regulating member.

Also, the regulating member 35b has a function as the support member 35c that functions as a frame that supports the shape of the air-blowing guide 35 itself. In other words, in the air conditioner S31 for a vehicle according to the embodiment, the regulating member 35b is integrally formed with one support member 35c.

As described above, the support member 35c is integrally formed with the regulating member 35b and is connected to each of four corners of the hot air guide tube 35a so as to function as the frame that supports the shape of the air-blowing guide itself. Also, as shown in FIGS. 10 and 11, the support member 35c and the regulating member 35b are arranged in parallel to each other. The support member 35c that is integrally formed with the regulating member 35b is arranged on an upper end (an end of the opening 31h for cool air away from the opening 31g for hot air) of the opening 31h for cool air. One support member 35c (a first support member 35c1) is arranged on a lower end (an end of the opening 31h for cool air close to the opening 31g for hot air) of the opening 31h for cool air. One support member 35c (a second support member 35c2) is arranged in an end of the opening 31g for hot air away from the opening 31h for cool air.

Also, as shown in FIG. 9, each of fitting grooves 31j that is extended in the vertical direction of the paper surface at the upper end (the end of the opening 31h for cool air away from the opening 31g for hot air) of the opening 31h for cool air, and an end of the opening 31g for hot air away from the opening 31h for cool air is formed. The regulating member 35b and the second support member 35c2 are fitted at the fitting groove 31j thereby the positioning of the air-blowing guide 35 is performed.

The adjusting member 35d is arranged horizontally at the opening 31h for cool air. In other words, the adjusting member 35d is arranged in parallel with the support member 35c at the opening 31h for cool air. The adjusting member 35d adjusts the cool air that is supplied to the mixing section 31c from the opening 31h for cool air so that vortex is prevented from being generated. Accordingly, flow noise is prevented from being generated. In other words, the air conditioner S31 for a vehicle according to the embodiment includes the adjusting member 35d that is disposed at the support member 35c and simultaneously performs adjusting of the cool air that is supplied from the opening 31h for cool air.

Thus, the adjusting member 35d constitutes a part of the air-blowing guide 35 and as shown in FIG. 11, a rear surface thereof is supported by a plurality of support ribs 35d1. The support ribs 35d1 constitute a part of the air-blowing guide 35 similar to the adjusting member 35d.

As shown in FIG. 9, the adjusting member 35d is arranged in parallel with respect to the airflow direction of the cool air from the opening 31h for cool air. Also, as shown in FIG. 9, in a case where the air mix damper 33a makes an opening ratio of the opening 31h for cool air to half time (in other words, in a case where the air mix damper 33a is positioned in a middle position that opens uniformly the opening 31h for cool air and the opening 31i for heating), the adjusting member 35d is arranged in a position that is extended to the airflow direction of the cool air from an end portion 33a1 of the air mix damper 33a. Furthermore, the adjusting member 35d is extended closer to the opening 31h for cool air than the support member 35c.

The engaging section 35e is engaged to the case 31 so that the air-blowing guide 35 is fixed to the case 31. Also, the flexible connecting section 35f arranges two engaging sections 35e to face to each other and connects them. The flexible connecting section 35f has circular arc shape and is formed from resin having flexibility the same as the other constituents of the case 31 and the air-blowing guide 35.

Returning to FIG. 9, the mode damper 36 for the defroster vent outlet is a damper that performs opening and closing of the defroster vent outlet 31d and is rotatable within the case 31.

The mode damper 37 for the face vent outlet is a damper that performs opening and closing of the face vent outlet 31e and is rotatable within the case 31.

The mode damper 38 for the foot vent outlet is a damper that performs opening and closing of the foot vent outlet 31f and is rotatable within the case 31.

A motor (not shown) supplies power to the air mix damper apparatus 33, the mode damper 36 for the defroster vent outlet, the mode damper 37 for the face vent outlet, and the mode damper 38 for the foot vent outlet.

According to the air conditioner S31 for a vehicle of the embodiment having the above-described configuration, in a case where both of the opening 31h for cool air and the opening 31i for heating are opened by the air mix damper apparatus 33, the air that is supplied to the cooling flow passage 31a is cooled by the evaporator 32, becomes cool air and then a portion of the cool air is supplied to the heating flow passage 31b.

Thus, the hot air that is heated and generated by the heater core 34 at the heating flow passage 31b is supplied to the mixing section 31c from the opening 31g for hot air. The cool air that is not supplied to the heating flow passage 31b is supplied to the mixing section 31c from the opening 31h for cool air.

The cool air and the hot air that are supplied to the mixing section 31c are guided to the air-blowing guide 35 and mixed, and then supplied into the vehicle through any one of openings of the defroster vent outlet 31d, the face vent outlet 31e, and the foot vent outlet 31f.

Here, the air conditioner S31 for a vehicle according to the embodiment includes the adjusting member 35d that is disposed at the mixing section 31c and performs adjusting of the cool air that is supplied from the opening 31h for cool air.

Thus, in the air conditioner S31 for a vehicle according to the embodiment, the cool air that is supplied to the mixing section 31c from the opening 31h for cool air is adjusted by the adjusting member 35d. Thus, vortex within the mixing section 31c is prevented from being generated and flow noise is prevented from being generated.

According to the air conditioner S31 for a vehicle according to the embodiment, in the air conditioner for a vehicle that mixes the hot air that is supplied from the opening 31g for hot air and the cool air that is supplied from the opening 31h for cool air at the mixing section 31c within the case 31, noise generated at the mixing section 31c can be decreased.

Also, in the air conditioner S31 for a vehicle according to the embodiment, the adjusting member 35d constitutes a part of the air-blowing guide 35 that guides the hot air and the cool air at the mixing section 31c.

The air-blowing guide 35 is formed from the injection molding and the air-blowing guide 35 is provided so that the adjusting member 35d can be formed and arranged. Thus, there is no need to have a process for manufacturing the adjusting member 35d separately, or a process for arranging the adjusting member 35d.

Also, in the air conditioner S31 for a vehicle according to the embodiment, the adjusting member 35d is arranged in parallel with respect to the airflow direction of the cool air from the opening 31h for cool air.

Thus, adjustment of the cool air can be performed without changing the airflow direction of the cool air from the opening 31h for cool air, and the adjustment effect can be increased and then generation of the abnormal noise can be further decreased than the case that the airflow direction of the cool air is changed.

Also, in the air conditioner S31 for a vehicle according to the embodiment, as shown in FIG. 9, in the case where the air mix damper 33a makes the opening ratio of the opening 31h for cool air to approximately half time (in other words, in a case where the air mix damper 33a is positioned in the middle position that opens approximately uniformly the opening 31h for cool air and the opening 31i for heating), the adjusting member 35d is arranged in a position that is extended to the airflow direction of the cool air from the end portion 33a1 of the air mix damper 33a.

Thus, in a case where the air mix damper 33a is arranged in the middle position, the cool air that is supplied to the mixing section 31c from the opening 31h for cool air can be flowed smoothly, the adjustment effect can be increased and then generation of abnormal noise can be further decreased.

Also, in the air conditioner S31 for a vehicle according to the embodiment, the adjusting member 35d is extended closer to the opening 31h for cool air side than the support member 35c.

Thus, the adjusting member 35d can be more adjacent to the opening 31h for cool air and retraction of the cool air can be decreased so that the adjustment effect can be increased and then generation of the abnormal noise can be further decreased.

Also, in the air conditioner S31 for a vehicle according to the embodiment, the air-blowing guide 35 includes support ribs 35d1 that support the adjusting member 35d.

Thus, even in a case where the adjusting member 35d is thin and the stiffness thereof is low, the adjusting member 35d can be reliably supported.

As described above, the preferred embodiment of the present invention has been described with reference to the drawings, however the present invention is not limited to the above-described embodiments. All shapes, assemblies or the like of each of the configurations illustrated in the above-described embodiments are examples of the present invention, and various modifications may be performed on the basis of the demands of the design without departing from the gist of the present invention.

For example, in the above-described embodiment, description has been given regarding the configuration in which the adjusting section of the present invention is the adjusting member 35d that is included in the air-blowing guide 35.

However, the present invention is not limited to the above-described embodiment; a configuration in which a member such as lattice member having an adjustment effect can be employed as the adjusting section can be used.

Also, to increase the adjustment effect in the adjusting member 35d, the surface of the adjusting member may have a wing shape. Furthermore, a configuration that includes a plurality of the adjusting members 35d can be employed.

Also, in the above-described embodiment, description has been given regarding the configuration that the first airflow is the cool air and the second airflow is the hot air.

However, the present invention is not limited to the above-described embodiment, and a configuration in which the first airflow is the hot air and the second airflow is the cool air can be employed. Moreover, two airflows that guide airflow routes having the same or different temperatures to each other may be the first airflow and the second airflow.

(4) Fourth Embodiment

Hereinafter, description will be made regarding the air conditioner for a vehicle according to the fourth embodiment of the present invention with reference to drawings. In the drawings, each of the members is appropriately suitably scaled to make it be of identifiable size.

Figure 12:
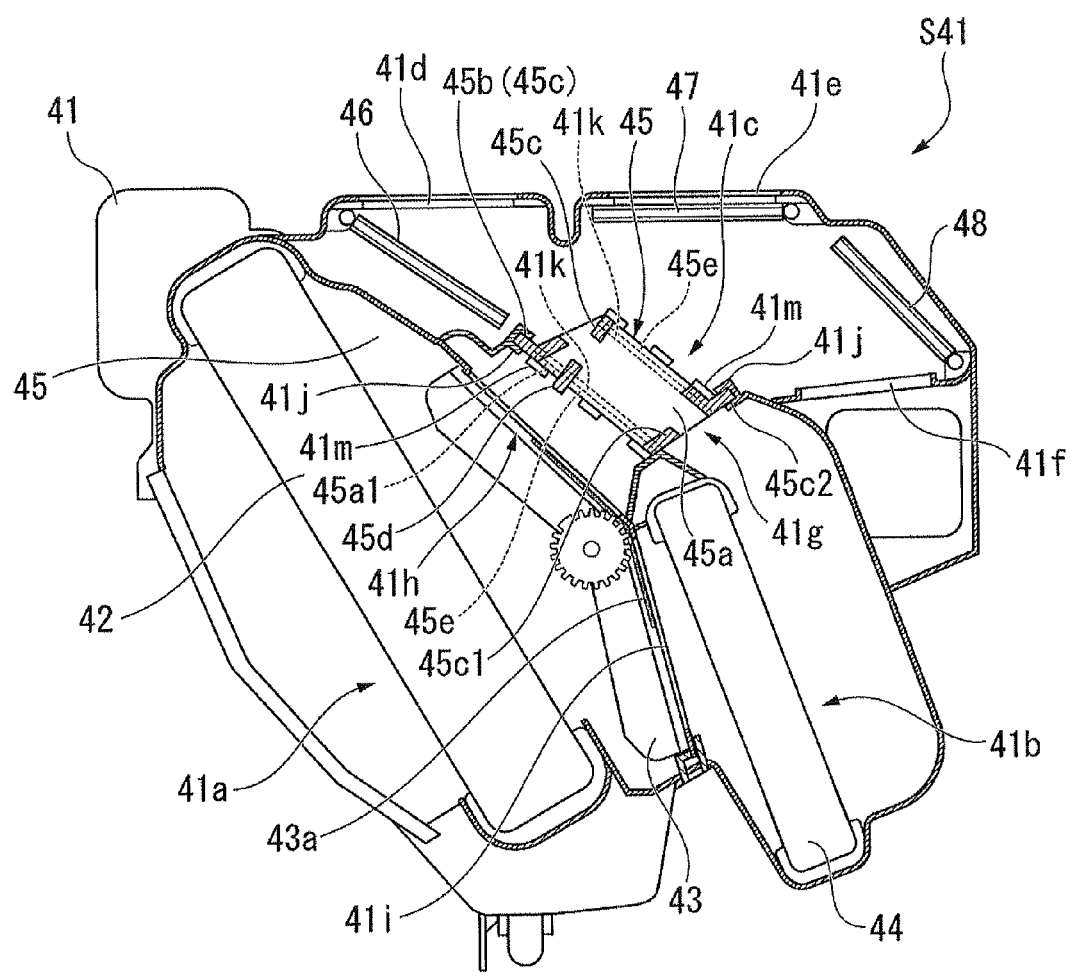
FIG. 12 is a cross sectional view schematically showing a configuration of the air conditioner for a vehicle according to a fourth embodiment of the present invention.

FIG. 12 is a cross sectional view schematically showing a configuration of the air conditioner for a vehicle S41 (HVAC: Heating Ventilation Air Conditioning) according to the fourth embodiment of the present invention. As shown in FIG. 12, the air conditioner for a vehicle S41 according to the embodiment includes a case 41, an evaporator 42, an air mix damper apparatus 43, a heater core 44, an air-blowing guide 45, a mode damper 46 for a defroster vent outlet, a mode damper 47 for a face vent outlet, and a mode damper 48 for a foot vent outlet.

The case 41 is formed an outer shape of the air conditioner for a vehicle S41 according to the fourth embodiment. The case 41 includes a cooling flow passage 41a in which the evaporator 42 is provided, a heating flow passage 41b in which the heater core 44 is provided, and a mixing section 41c in which cool air (a first airflow) and hot air (a second airflow) are mixed and become conditioned air. Also, a plurality of vent outlets (a defroster vent outlet 41d, a face vent outlet 41e and a foot vent outlet 41f) that is exposed to the outside and is connected to the mixing section 41c (a mixing region) is provided in the case 41.

The defroster vent outlet 41d is an opening to supply the conditioned air with respect to a window shield. The face vent outlet 41e is an opening to supply the conditioned air with respect to the face of the occupant. The foot vent outlet 41f is an opening to supply the conditioned air with respect to the feet of the occupant.

As shown in FIG. 12, an opening 41g for hot air that supplies the hot air to the mixing section 41c from the heating flow passage 41b in which the heater core 44 is provided, an opening 41h for cool air that supplies the cool air to the mixing section 41c from the cooling flow passage 41a in which the evaporator 42 is provided, and an opening 41i for heating that supply the cool air to the heating flow passage 41b from the cooling flow passage 41a are provided in the case 41.

The evaporator 42 is a part of a refrigeration cycle that is mounted on the vehicle and is arranged within the cooling flow passage 41a. The evaporator 42 cools air that is supplied in the cooling flow passage 41a by a blower (not shown) and then generates the cool air.

The air mix damper apparatus 43 is arranged on the downstream side of the evaporator 42 and regulates an amount of the cool air that is generated at the evaporator 42 to the heating flow passage 41b. More specifically, the air mix damper apparatus 43 includes an air mix damper 43a that is freely slidable between the opening 41h for cool air and the opening 41i for heating. An opening ratio between the opening 41h for cool air and the opening 41i for heating can be regulated by the air mix damper 43a. Accordingly, the cool air supply amount to the heating flow passage 41b can be regulated. As a result, a mixing ratio between the cool air and the hot air in the mixing section 41c can be regulated so that the temperature of the conditioned air can be regulated.

The heater core 44 is arranged within the heating flow passage 41b and heats the cool air that is supplied through the opening 41i for heating so that the heater core 44 generates the hot air.

The air-blowing guide 45 is provided in the mixing section 41c that is a mixing region of the hot air and the cool air within the case and guides the hot air and the cool air.

Figure 13:
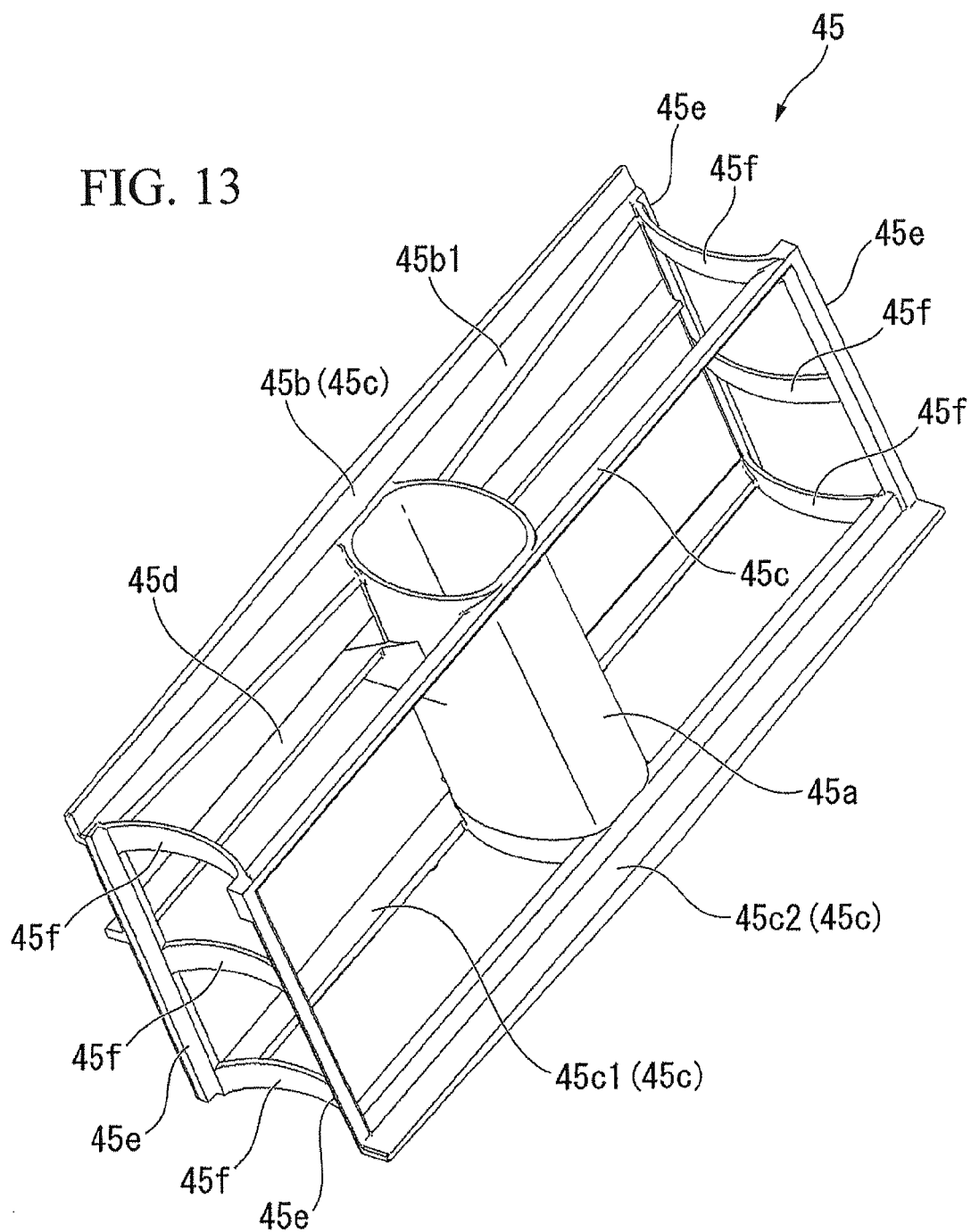
FIG. 13 is a perspective view showing the air-blowing guide that is included in the air conditioner for a vehicle according to the fourth embodiment seen from the side opposite of the opening for cool air that is provided within the case.
Figure 14:
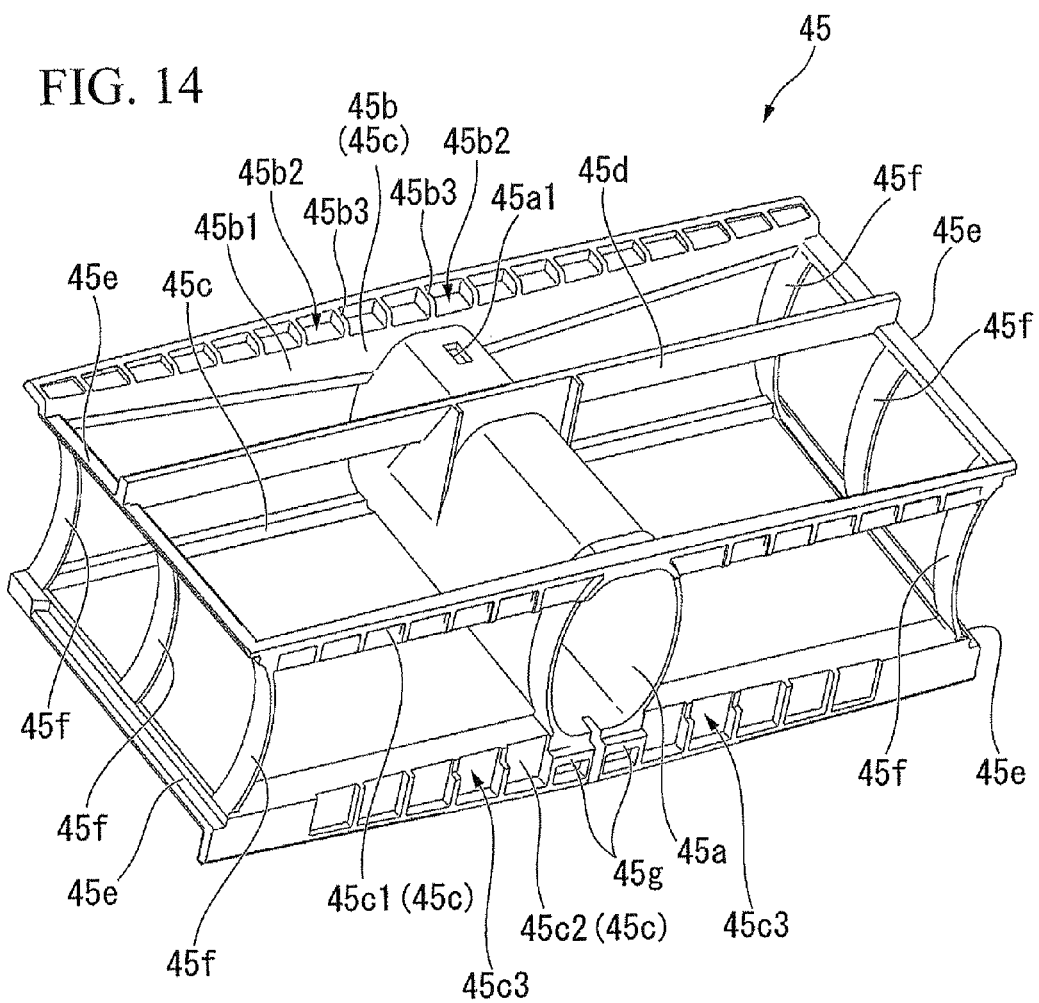
FIG. 14 is a perspective view showing the air-blowing guide that is included in the air conditioner for a vehicle according to the fourth embodiment seen from the side of the opening for cool air that is provided within the case.

FIGS. 13 and 14 are perspective views of the air-blowing guide 45. FIG. 13 is a perspective view seen from a side opposite the opening 41h for cool air. FIG. 14 is a perspective view seen from a side of the opening 41h for cool air. As shown in the drawings, the air-blowing guide 45 includes a hot air guide tube 45a (the second airflow guide passage), a regulating member 45b, a support member 45c, an adjusting member 45d, an engaging section 45e and a flexible connecting section 45f.

The hot air guide tube 45a is a straight tube shape member that guides a portion of the hot air that is supplied to the mixing section 41c from the opening 41g for hot air to the defroster vent outlet 41d without mixing with the cool air. One opening end of the hot air guide tube 45a is connected to the opening 41g for hot air and the other opening end is arranged so as to be directed to the defroster vent outlet 41d.

As shown in FIG. 14, a cool air introduction opening 45a1 (a first air introduction opening) for introducing the cool air to the hot air guide tube 45a is formed at a portion which is close to the regulating member 45b and a surface of the opening 41h for cool air side of the hot air guide tube 45a. As described above, a portion of the cool air that is supplied to the mixing section 41c from the opening 41h for cool air is introduced in the hot air guide tube 45a. Thus, even in a case where the air mix damper slightly opens the opening 41h for cool air, the cool air introduction opening 45a1 is disposed in the vicinity of the upper portion (a side that the opening 41h for cool air begins to open) of the hot air guide tube 45a whereby the cool air is introduced within the hot air guide tube 45a.

The regulating member 45b directs the air blow direction of the cool air that is supplied to the mixing section 41c from the opening 41h for cool air toward the opening 41g for hot air such that the region 45b1 that is opposite to the opening 41h for cool air is inclined toward the opening 41g for hot air.

The regulating member 45b regulates a flow rate distribution of the cool air that is supplied to the mixing section 41c from the opening 41h for cool air according to the flow rate distribution of the hot air that is supplied to the mixing section 41c from the opening 41g for hot air such that the width of an inclined region 45b1 is changed in an extension direction of the regulating member 45b.

Also, the regulating member 45b is formed such that the center portion is thicker than the end portion in extension direction by appearance. In a case where the thickness of the regulating member 45b are different in the extension direction, the deformation amounts due to the heat are different to each other according to the position of the regulating member 45b and it leads to local contract of the regulating member 45b. Thus, in the air conditioner for a vehicle S41 according to the embodiment, as shown in FIG. 14, a thickness extraction region 45b2 is formed in rear surface of the regulating member 45b whereby the thickness may be uniformized in the extension direction of the regulating member 45b. A depth of the center portion of the regulating member 45b is deeper than that of the end portion of the thickness extraction region 45b2. Thus, the thickness of the regulating member 45b is uniformized in the extension direction of the regulating member 45b.

As shown in FIG. 14, in the air conditioner for a vehicle S41 according to the embodiment, to secure the stiffness of the regulating member 45b, the thickness extraction regions 45b2 are variedly formed at various positions so as to remain ribs 45b3.

Also, the regulating member 45b has a function as the support member 45c that functions as a frame that supports the air-blowing guide 45 itself. In other words, in the air conditioner for a vehicle S41 according to the embodiment, the regulating member 45b is integrally formed with one support member 45c.

As described above, the support member 45c is integrally formed with the regulating member 45b and is connected to each of four corners of the hot air guide tube 45a so as to function as the frame that supports the shape of the air-blowing guide itself. Also, as shown in FIGS. 13 and 14, the support member 45c and the regulating member 45b are arranged in parallel to each other. The support member 45c that is integrally formed with the regulating member 45b is arranged on an upper end (an end of the opening 41h for cool air away from the opening 41g for hot air) of the opening 41h for cool air. One support member 45c (a first support member 45c1) is arranged on the lower end (the end of the opening 41h for cool air adjacent the opening 41g for hot air) of the opening 41h for cool air. One support member 45c (a second support member 45c2) is arranged in an end of the opening 41g for hot air away from the opening 41h for cool air.

Also, as shown in FIG. 12, each of fitting grooves 41j that is extended to the vertical direction of the paper surface at the upper end (the end of the opening 41h for cool air away from the opening 41g for hot air) of the opening 41h for cool air, and an end of the opening 41g for hot air away from the opening 41h for cool air is formed. The regulating member 45b and the second support member 45c2 are fitted at the fitting groove 41j so that the positioning of the air-blowing guide 45 is performed.

Thus, in the air conditioner for a vehicle S41 according to the embodiment, as shown in FIG. 14, the second support member 45c2 that is disposed at the opening 41g for hot air that supplies the hot air to the mixing section 41c includes reinforcing ribs 45g that are extended in the extension direction (in other words, the direction orthogonal to the flow direction of the hot air that passes through the opening 41g for hot air) of the second support member 45c2.

The supporting ribs 45g are arranged in the center portion of the second support member 45c2. Thus, the center portion of the second support member 45c2 is reinforced.

Also, as shown in FIG. 14, thickness extraction regions 45c3 are also formed in rear surfaces of the first support member 45c1 and the second support member 45c2 the same as the regulating member 45b.

The adjusting member 45d is arranged horizontally at the opening 41h for cool air. In other words, the adjusting member 45d is arranged in parallel with the support member 45c at the opening 41h for cool air. The adjusting member 45d adjusts the cool air that is supplied to the mixing section 41c from the opening 41h for cool air so that vortex is prevented from being generated. Accordingly, flow noise is prevented from being generated.

The engaging section 45e is engaged to the case 41 so that the air-blowing guide 45 is fixed to the case 41. Also, the flexible connecting section 45f arranges two engaging sections 45e facing to each other and connects them. The flexible connecting section 45f has an arc shape and is formed from resin having flexibility the same as the other constituents of the case 41 and the air-blowing guide 45.

Return to FIG. 12, the mode damper 46 for the defroster vent outlet is a damper that performs opening and closing of the defroster vent outlet 41d and is rotatable within the case 41.

The mode damper 47 for the face vent outlet is a damper that performs opening and closing of the face vent outlet 41e and is rotatable within the case 41.

The mode damper 48 for the foot vent outlet is a damper that performs opening and closing of the foot vent outlet 41f and is rotatable within the case 41.

A motor (not shown) supplies power to the air mix damper apparatus 43, the mode damper 46 for the defroster vent outlet, the mode damper 47 for the face vent outlet, and the mode damper 48 for the foot vent outlet.

According to the air conditioner for a vehicle S41 of the embodiment having the above-described configuration, in a case where both of the opening 41h for cool air and the opening 41i for heating are opened by the air mix damper apparatus 43, the air that is supplied to the cooling flow passage 41a is cooled by the evaporator 42, becomes cool air and then a portion of the cool air is supplied to the heating flow passage 41b.

Thus, the hot air that is heated and generated by the heater core 44 at the heating flow passage 41b is supplied to the mixing section 41c from the opening 41g for hot air. The cool air that is not supplied to the heating flow passage 41b is supplied to the mixing section 41c from the opening 41h for cool air.

The cool air and the hot air that are supplied to the mixing section 41c are guided to the air-blowing guide 45 and mixed, and then supplied within the vehicle through any one of the openings of the defroster vent outlet 41d, the face vent outlet 41e, and the foot vent outlet 41f.

Here, in the air conditioner for a vehicle S41 according to the embodiment, the air-blowing guide 45 includes the hot air guide tube 45a that guides a portion of the hot air without mixing with the cool air at the mixing section 41c and the cool air introduction opening 45a1 that is opened toward the hot air guide tube 45a and introduces a portion of the cool air to the hot air guide tube 45a.

Thus, a phenomenon where the temperature at the outlet side of the hot air guide tube 45a is too high can be suppressed.

According to the air conditioner for a vehicle S41 of the embodiment, in the air conditioner having the air-blowing guide, the temperature of the conditioned air can be controlled to be better optimized than that of the existing air conditioner.

(5) Fifth Embodiment

Next, description will be given regarding a fifth embodiment of the present invention. Also, in the description of the embodiment, portions that are the same as those of the fourth embodiment are not described or briefly described.

Figure 15:
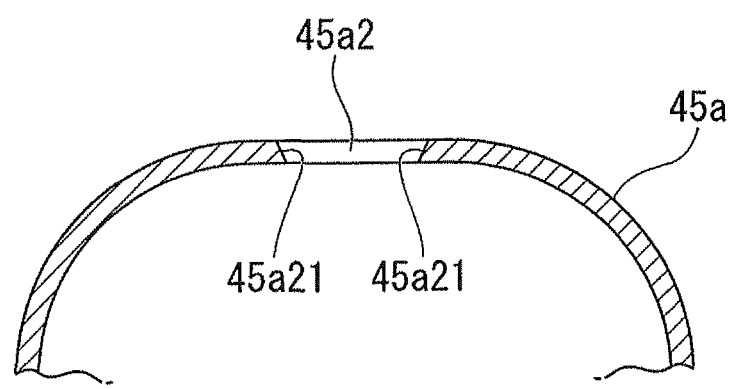
FIG. 15 is a partial cross sectional view of a hot air guiding tube 45*a* of the air-blowing guide that is included in the air conditioner for a vehicle according to a fifth embodiment of the present invention.

FIG. 15 is a partial cross sectional view showing a portion of the hot air guiding tube 45a of the air-blowing guide 45 that is included in the air conditioner for a vehicle according to the embodiment.

As illustrated, the air-blowing guide 45 of the air conditioner for a vehicle according to the embodiment is changed to the cool air introduction opening 45a1 in the fourth embodiment so that the air-blowing guide 45 includes the cool air introduction opening 45a1 in which a side wall 45a21 is inclined so as to become narrower toward the inside of the hot air guide tube 45a.

According to the air conditioner for a vehicle of the embodiment having the above-described configuration, a flow speed of the cool air that is supplied into the hot air guide tube 45a through the cool air introduction opening 45a1 can be increased. Thus, the cool air can be effectively introduced into the hot air guide tube 45a.

(6) Sixth Embodiment

Next, description will be given regarding a sixth embodiment of the present invention. Also, in the description of the embodiment, portions that are the same as those of the fourth embodiment are not described or briefly described.

Figure 16:
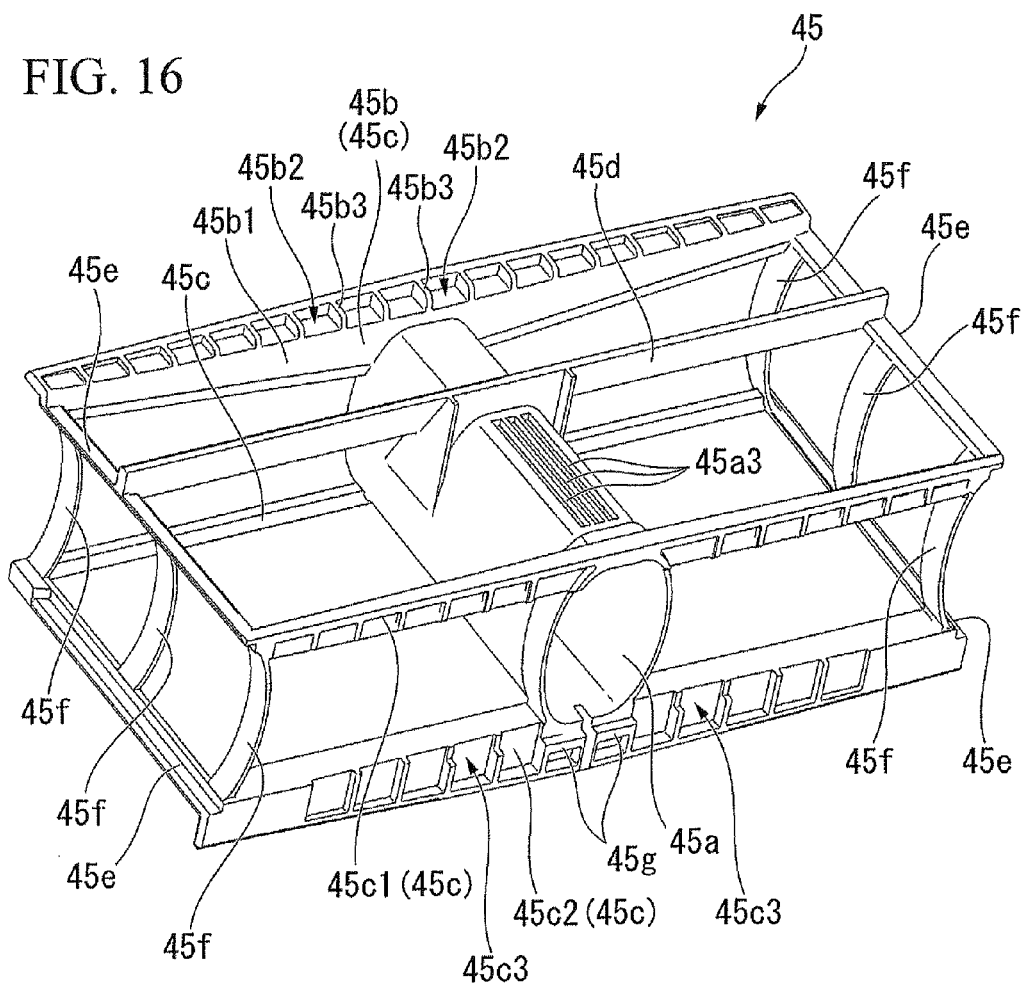
FIG. 16 is a perspective view showing the air-blowing guide that is included in the air conditioner for a vehicle according to a sixth embodiment seen from the side of the opening for cool air that is provided within the case.

FIG. 16 is a perspective view showing the air-blowing guide 45 that is included in the air conditioner for a vehicle according to the sixth embodiment seen from the side of the opening 41h for cool air.

As illustrated, the air-blowing guide 45 of the air conditioner for a vehicle according to the embodiment is changed to the cool air introduction opening 45a1 in the fourth embodiment so that the air-blowing guide 45 includes the cool air introduction openings 45a3 that are long in an air blowing direction of the hot air that is flowed in the hot air guide tube 45a and are formed in plurality in the direction orthogonal to the flow direction.

According to the air conditioner for a vehicle of the embodiment having the above-described configuration, the flow rate of the cool air that is introduced into the hot air guide tube 45a is increased without providing a single large opening for cool air. Moreover, by contrast to a case where a single large opening for cool air is provided, the stiffness of the hot air guide tube 45a can be prevented from being decreased.

Also, in the embodiment, the cool air introduction openings 45a3 are provided more adjacent the lower portion of the hot air guide tube 45a than that of above-described fourth embodiment. The position of the cool air introduction openings 45a3 of the hot air guide tube 45a is adjusted and the distance to the opening 41h for cool air is adjusted so that the cool air amount that is introduced into the tube can be adjusted.

Also, the size of each of cool air introduction openings 45a4 is not necessary to be uniformized as shown in FIG. 16 and the size of individual cool air introduction opening 45a4 may be changed according to the flow rate distribution of the hot air that passes through within the hot air guide tube 45a so that the temperature adjustment can be performed in detail.

(7) Seventh Embodiment

Next, description will be given regarding a seventh embodiment of the present invention. Also, in the description of the embodiment, portions that are the same as those of the fourth embodiment are not described or briefly described.

Figure 17:
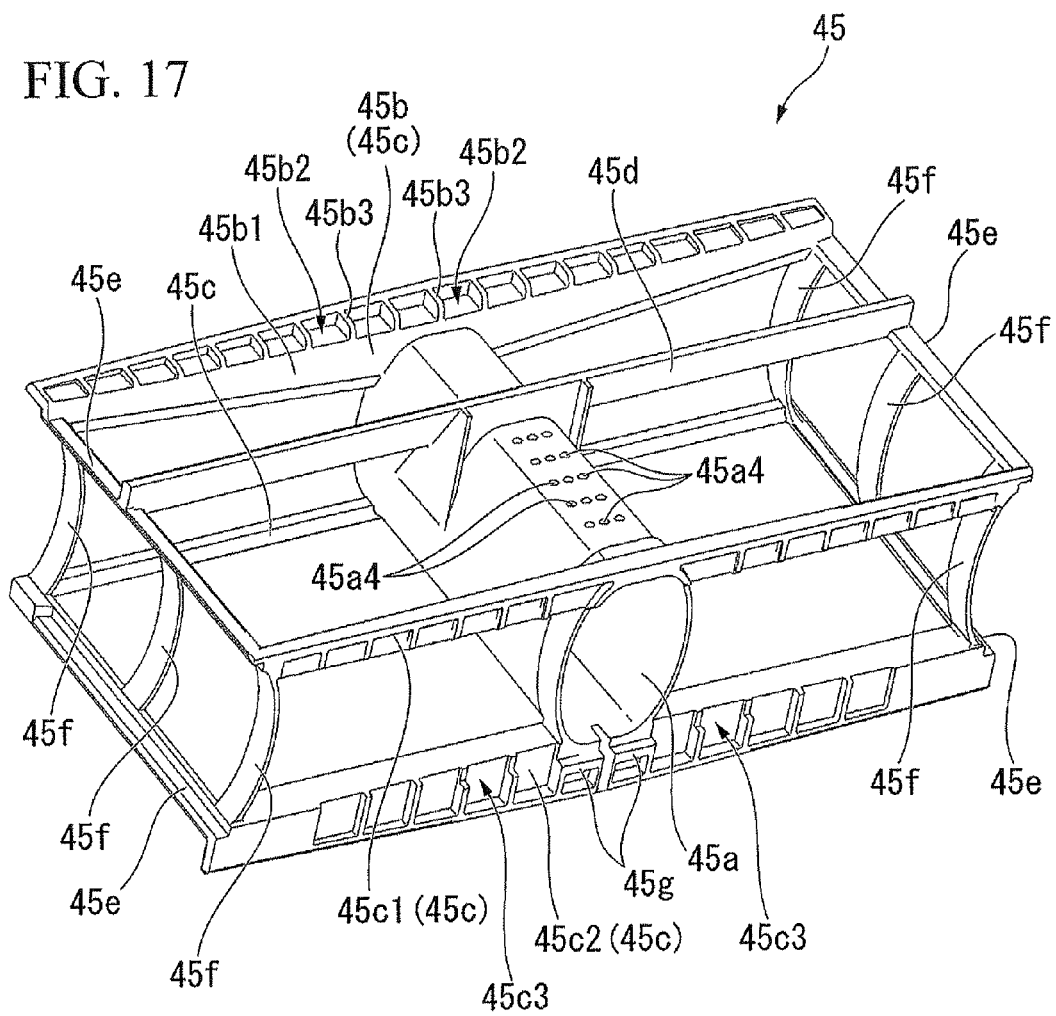
FIG. 17 is a perspective view showing the air-blowing guide that is included in the air conditioner for a vehicle according to a seventh embodiment seen from the side of the opening for cool air that is provided within the case.

FIG. 17 is a perspective view showing the air-blowing guide 45 that is included in the air conditioner for a vehicle according to the seventh embodiment seen from the side of the opening 41h for cool air.

As illustrated, the air-blowing guide 45 of the air conditioner for a vehicle according to the embodiment is changed to the cool air introduction opening 45a1 in the fourth embodiment so that the air-blowing guide 45 includes small and circular shaped cool air introduction openings 45a4 that are formed in plurality in the air blowing direction and orthogonal to the air flow direction of the hot air that flows the hot air guide tube 45a.

According to the air conditioner for a vehicle of the embodiment having the above-described configuration, the cool air introduction openings 45a4 are variedly formed in plurality in the air blowing direction of the hot air that flows the hot air guide tube 45a so that the flow rate of the cool air that is introduced into the hot air guide tube 45a can be secured and compact of individual cool air introduction opening 45a4 can be realized.

Thus, the cool air introduction openings 45a4 become compact so that sound can be decreased when the cool air is introduced into the hot air guide tube 45a.

As described above, the preferred embodiments of the present invention have been described with reference to the drawings, however the present invention is not limited to the above-described embodiments. All shapes, assemblies or the like of each of the configurations illustrated in the above-described embodiments are examples of the present invention, and various modifications may be performed on the basis of the demands of the design without departing from the gist of the present invention.

For example, in the above-described embodiments, description has been given regarding the configuration that the first airflow is the cool air and the second airflow is the hot air.

However, the present invention is not limited to the above-described embodiments, and a configuration in which the first airflow is the hot air and the second airflow is the cool air can be employed. Moreover, two airflows that guide air blowing routes having the same or different temperatures to each other may be the first airflow and the second airflow.

Also, in the above-described embodiments of the present invention, description has been made regarding the configuration that the second airflow guide passage is tube shaped hot air guide tube.

However, the present invention is not limited to the above-described embodiment, and a configuration that the second airflow guide passage is U shaped half pipe can be employed.

Also, in above-described embodiments, description has been made regarding the configuration that the cool air introduction opening is rectangular or circular shape.

However, the present invention is not limited to the above-described embodiment, and the shape of the cool air introduction opening may be any shape. For example, the shape of the cool air introduction opening may also be a triangle or oval. In a case where the shape of the cool air introduction opening is a triangle or oval, the flow rate or the flow rate distribution of the cool air that is supplied into the hot air guide tube 45a is changed according to the posture of the cool air introduction opening. Thus, the posture of the cool air introduction opening is appropriately suitably arranged according to a desired temperature of the conditioned air.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An air conditioner for a vehicle comprising:
a case providing a flow passage for flowing airflows therein, the flow passage including a cooling flow passage in which an evaporator is provided, a heating flow passage in which a heater core is provided, and a mixing section being a mixing region of a hot air flowing through the heating flow passage and a cool air flowing through the cooling flow passage;

an air-blowing guide being arranged in the mixing section and guiding the hot air and the cool air, the air-blowing guide extending in a width direction in the flow passage, the air-blowing guide including a pair of first engaging sections at a first end of an extension direction of the air-blowing guide, a first flexible connecting section that elastically deforms, and connects the first engaging sections with each other, a pair of second engaging sections at a second end of the extension direction of the air-blowing guide, a second flexible connecting section that elastically deforms and connects the second engaging sections with each other, and a hot air guide tube guiding the hot air from a first opening end of the hot air guide tube to a second opening end of the hot air guide tube without being mixed with the cool air, the hot air being supplied from an opening for hot air to the mixing section, and the cool air being supplied from an opening for cool air to the mixing section; and a pair of first protrusions and a pair of second protrusions provided in an interior wall of the case, the first protrusions engaging the first engaging sections and the second protrusions engaging the second engaging sections.

2. The air conditioner for a vehicle according to claim 1, wherein at least any one surface of contacting surfaces of the first engaging sections with respect to the first protrusions and contacting surfaces of the first protrusions with respect to the engaging sections is inclined with respect to the interior wall of the case.

3. The air conditioner for a vehicle according to claim 1, wherein the flexible connecting section has an arc shape, and wherein the first engaging sections are engaged with outer side surfaces of the first protrusions.

4. The air conditioner for a vehicle according to claim 1, further comprising a protruding section that is provided so as to hold one of the first engaging sections between one of the first protrusions and the protruding section.

5. The air conditioner for a vehicle according to claim 1, wherein the first engaging sections are arranged and extended in a same direction as the hot air guide tube, the first protrusions are formed to extend in a same direction as the first engaging sections and spaced apart in the same direction as the first engaging sections, and a minimum interval between insides of the first engaging sections to each other is set slightly smaller than the minimum interval between outsides of the first protrusions to each other.

6. The air conditioner for a vehicle according to claim 1, further comprising:

a regulating member that directs an air blow direction of the cool air being supplied from a direction perpendicular to an extension direction of the hot air guide tube toward the opening for hot air such that a region being opposite to the opening for cool air being inclined toward the opening for hot air.

7. The air conditioner for a vehicle according to claim 6, wherein a width of an inclined region of the regulating member is changed in an extension direction of the regulating member.

8. The air conditioner for a vehicle according to claim 1, further comprising:

a regulating member that directs an air flow direction of the cool air being supplied from a direction perpendicular to an extension direction of the hot air guide tube toward the opening for hot air such that a region being opposite to the opening for cool air being inclined toward the opening for hot air, wherein the first engaging sections of the air-blowing guide are arranged and extended in a same direction as the hot air guide tube, the first protrusions are formed to extend in a same direction as the first engaging sections and spaced apart in the same direction as a pair of the engaging sections, and a minimum interval between insides of the first engaging sections to each other is set slightly smaller than the minimum interval between outsides of the first protrusions to each other.

9. The air conditioner for a vehicle according to claim 8, wherein a width of an inclined region of the regulating member is changed in an extension direction of the regulating member.

* * * * *